United States Patent
Matsuoka et al.

(10) Patent No.: US 8,450,039 B2
(45) Date of Patent: May 28, 2013

(54) BINDER RESIN FOR COLOR TONERS AND COLOR TONER USING THE SAME

(75) Inventors: Hiroshi Matsuoka, Ichihara (JP); Kazuya Sakata, Ichihara (JP); Hiroyuki Takei, Kamagaya (JP); Kenji Uchiyama, Odawara (JP); Ichirou Sasaki, Chiba (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 380 days.

(21) Appl. No.: 12/675,362

(22) PCT Filed: Aug. 27, 2008

(86) PCT No.: PCT/JP2008/002318
§ 371 (c)(1), (2), (4) Date: Feb. 25, 2010

(87) PCT Pub. No.: WO2009/028177
PCT Pub. Date: Mar. 5, 2009

(65) Prior Publication Data
US 2010/0209837 A1   Aug. 19, 2010

(30) Foreign Application Priority Data

Aug. 30, 2007   (JP) .................................. 2007-224178

(51) Int. Cl.
*G03G 9/087*   (2006.01)

(52) U.S. Cl.
USPC .................................. 430/109.2; 430/137.15

(58) Field of Classification Search
USPC .......................................... 430/109.2, 137.15
See application file for complete search history.

(56) References Cited

U.S. PATENT DOCUMENTS

| | | | |
|---|---|---|---|
| 5,262,265 A | 11/1993 | Matsunaga et al. | |
| 5,817,443 A | 10/1998 | Matsushima et al. | |
| 6,329,115 B1 | 12/2001 | Yamashita | |
| 2003/0152857 A1* | 8/2003 | Sugiura et al. | 430/109.2 |
| 2004/0068052 A1 | 4/2004 | Uosaki et al. | |
| 2004/0161688 A1* | 8/2004 | Itakura et al. | 430/108.4 |
| 2005/0100808 A1 | 5/2005 | Hashimoto et al. | |
| 2005/0106485 A1 | 5/2005 | Yamazaki et al. | |
| 2005/0186497 A1 | 8/2005 | Moribe et al. | |
| 2005/0186499 A1 | 8/2005 | Okubo et al. | |
| 2007/0122731 A1 | 5/2007 | Yoshida et al. | |
| 2009/0142683 A1 | 6/2009 | Hashimoto et al. | |
| 2010/0248121 A1 | 9/2010 | Sakata et al. | |

FOREIGN PATENT DOCUMENTS

| | | |
|---|---|---|
| EP | 1 566 703 A2 | 8/2005 |
| JP | 3-118552 A | 5/1991 |
| JP | 6-175455 A | 6/1994 |
| JP | 10-69119 A | 3/1998 |
| JP | 10-090943 A | 4/1998 |
| JP | 10-133422 A | 5/1998 |
| JP | 10-142838 A | 5/1998 |
| JP | 10-171162 A | 6/1998 |
| JP | 2001-188383 A | 7/2001 |
| JP | 2002-189316 A | 7/2002 |
| JP | 2002-365842 A | 12/2002 |
| JP | 2003-255599 A | 9/2003 |
| JP | 2004-53622 A | 2/2004 |
| JP | 2004-62168 A | 2/2004 |
| JP | 2004-144860 A | 5/2004 |
| JP | 2004-177969 A | 6/2004 |
| JP | 2005-134891 A | 5/2005 |
| JP | 2005-266788 A | 9/2005 |
| JP | 2005-266789 A | 9/2005 |
| JP | 2006-171364 A | 6/2006 |
| KR | 2005-0043694 A | 5/2005 |
| WO | WO 2004/015498 A1 | 2/2004 |
| WO | WO 2005/028545 A1 | 9/2004 |

OTHER PUBLICATIONS

Extended Search Report from European Patent Office issued in corresponding European Patent Application No. 08828725.5 dated Dec. 9, 2010.
International Search Report for PCT/JP2008/002318 mailed Dec. 2, 2008.
Office Action from Korean Patent Office issued in related Korean Patent Application No. 10-2010-7006859 dated Oct. 26, 2011.

* cited by examiner

*Primary Examiner* — Mark F Huff
*Assistant Examiner* — Jonathan Jelsma
(74) *Attorney, Agent, or Firm* — Buchanan Ingersoll & Rooney PC

(57) ABSTRACT

Provided is a binder resin for color toners which comprises at least a carboxyl group-containing vinyl resin (C), a glycidyl group-containing vinyl resin (E) and a reaction product thereof, wherein the storage modulus G' at 160 degrees centigrade is not less than 20 and less than 800 Pa measured at a frequency of 6.28 rad/sec, the tetrahydrofuran (THF) soluble portion in the binder resin has a main peak in the molecular weight region of not less than 20,000 and less than 40,000 in the molecular weight distribution measured by gel permeation chromatography (GPC), and the binder resin contains at least one of releasing agents having a melting point of not lower than 60 and not higher than 120 degrees centigrade in an amount of not less than 3.5 and not more than 12 mass % based on 100 mass % of the total amount of the carboxyl group-containing vinyl resin (C), the glycidyl group-containing vinyl resin (E) and a reaction product thereof.

23 Claims, No Drawings

BINDER RESIN FOR COLOR TONERS AND COLOR TONER USING THE SAME

TECHNICAL FIELD

The present invention relates to a binder resin for color toners and a color toner using the same.

BACKGROUND ART

In general, electrophotography in a PPC (Plain Paper Copy) copier or printer for transferring a toner image formed on a photo-sensitive material to recording paper is carried out in the procedure described below. First, an electrostatic latent image is formed on the photo-sensitive material, the latent image is developed by using a toner, the toner image is transferred onto a sheet to be fixed such as paper or the like, and then the transferred toner image is fixed by heating with a heat roll or a film. Since the fixation is carried out under heat in a state that the heat roll or the film is directly brought into contact with the toner on the sheet to be fixed according to this method, it is performed in a short period of time and with a very high thermal efficiency, thereby achieving a very good fixing efficiency. However, though having a good thermal efficiency, the heat fixing method has a problem of a so-called offset phenomenon since the toner is brought into contact with the surface of the heat roll or the film in the melt state.

In order to obtain a resin excellent in the fixing properties and offset resistance, there has been known a resin obtained by using a high molecular weight resin and a low molecular weight resin in mixture and crosslinking a high molecular weight portion. Furthermore, to exhibit both the low temperature fixing properties and offset resistance, various techniques have been disclosed in the documents (for example, Patent Documents 1 to 4). However, these documents disclose a design suitable for a toner for monochrome use. The techniques disclosed in these documents are effective in both the low temperature fixing properties and offset resistance, but a design different from that of a toner for monochrome use is required when such a toner is applied to a color toner.

Gloss is required as an object to achieve specific to a color toner. When a toner for monochrome use is applied to a color toner, there has been still room for improvement in view of the gloss. In particular, even though a toner for monochrome use requires high elasticity in order to improve offset resistance, there has been a problem such that the unevenness on the printed surface in the color toner is caused, thereby impairing the gloss.

In Patent Document 5, there has been disclosed a binder resin without containing a gel portion, while in Patent Document 6, there has been disclosed a color toner having the content of a gel component of less than 5 weight %. However, in these documents, since the range of Mw/Mn is narrow, offset resistance is not sufficient. Therefore, there is room for improvement in balancing the gloss and offset resistance. Furthermore, when a high molecular component ratio and gel content are reduced in order to enhance the gloss, there is also a problem of reduction of durability.

Patent Document 1: Japanese Patent Laid-open No. 2002-189316
Patent Document 2: Japanese Patent Laid-open No. 2004-144860
Patent Document 3: Japanese Patent Laid-open No. H10-90943
Patent Document 4: International Publication Pamphlet No. 2004-015498
Patent Document 5: Japanese Patent Laid-open No. 2004-177969
Patent Document 6: Japanese Patent Laid-open No. H10-171162

DISCLOSURE OF THE INVENTION

The present invention is to solve a problem specific to a color toner. Specifically, the present invention is to provide a binder resin for color toners and a color toner excellent in balancing the gloss, durability and various properties required for a toner.

The present invention provides a binder resin for color toners, wherein the binder resin contains at least a carboxyl group-containing vinyl resin (C), a glycidyl group-containing vinyl resin (E) and a reaction product thereof, the storage modulus G' at 160 degrees centigrade is not less than 20 Pa and less than 800 Pa measured at a frequency of 6.28 rad/sec, the tetrahydrofuran (THF) soluble portion in the binder resin has a main peak in the molecular weight region of not less than 20,000 and less than 40,000 in the molecular weight distribution measured by gel permeation chromatography (GPC), and the binder resin contains at least one of releasing agents having a melting point not lower than 60 degrees centigrade and not higher than 120 degrees centigrade in an amount of not less than 3.5 mass % and not more than 12 mass % based on 100 mass % of the total amount of the carboxyl group-containing vinyl resin (C), the glycidyl group-containing vinyl resin (E) and a reaction product thereof.

In the aforementioned binder resin for color toners, the integrated value of the content of the tetrahydrofuran (THF) soluble portion in the binder resin in the molecular weight region of not more than 2,000 may be not more than 7.0 mass % based on the total THF soluble portion.

In the aforementioned binder resin for color toners, the weight-average molecular weight (Mw) may be not more than 170,000 and the weight-average molecular weight (Mw)/the number-average molecular weight (Mn) may be not less than 5 and not more than 40.

Meanwhile, the present invention provides a binder resin for color toners, wherein the binder resin contains at least a carboxyl group-containing vinyl resin (C), a glycidyl group-containing vinyl resin (E) and a reaction product thereof, the storage modulus G' at 160 degrees centigrade is not less than 20 Pa and less than 800 Pa measured at a frequency of 6.28 rad/sec, the tetrahydrofuran (THF) soluble portion in the binder resin has a main peak in the molecular weight region of not less than 20,000 and less than 40,000 in the molecular weight distribution measured by gel permeation chromatography (GPC), the binder resin contains at least one of releasing agents having a melting point not lower than 60 degrees centigrade and not higher than 120 degrees centigrade in an amount of not less than 3.5 mass % and not more than 12 mass % based on 100 mass % of the total amount of the carboxyl group-containing vinyl resin (C), the glycidyl group-containing vinyl resin (E) and a reaction product thereof, the integrated value of the content of the tetrahydrofuran (THF) soluble portion in the binder resin in the molecular weight region of not more than 2,000 is not more than 7.0 mass % based on the total THF soluble portion, and the weight-average molecular weight (Mw) is not more than 170,000 and the weight-average molecular weight (Mw)/the number-average molecular weight (Mn) is not less than 5 and not more than 40.

In the aforementioned binder resin for color toners, the content of a volatile component remained in the binder resin may be not more than 200 ppm.

In the aforementioned binder resin for color toners, the softening point may be not more than 130 degrees centigrade.

In the aforementioned binder resin for color toners, the releasing agent in the binder resin may be dispersed with an average diameter of not more than 1 micro-meter.

The aforementioned binder resin for color toners satisfies the following conditions: the carboxyl group-containing vinyl resin (C) contains a high molecular weight vinyl resin (H) in which the THF soluble portion has a peak in the molecular weight region of not less than 150,000 and less than 350,000 in the GPC chromatogram and a low molecular weight vinyl resin (L) in which the THF soluble portion has a peak in the molecular weight region of not less than 20,000 and less than 40,000 in the GPC chromatogram;

the mass ratio (H/L) of the high molecular weight vinyl resin (H) to the low molecular weight vinyl resin (L) in the carboxyl group-containing vinyl resin (C) is from 10/90 to 30/70;

the acid value of the high molecular weight vinyl resin (H) in the carboxyl group-containing vinyl resin (C) is not less than 10 mgKOH/g and not more than 26 mgKOH/g and the acid value of the low molecular weight vinyl resin (L) is not less than 6 mgKOH/g and not more than 30 mgKOH/g;

the acid value of the carboxyl group-containing vinyl resin (C) is not less than 6 mgKOH/g and not more than 30 mgKOH/g;

the THF soluble portion in the glycidyl group-containing vinyl resin (E) has a peak in the molecular weight region of not less than 20,000 and not more than 80,000 in the GPC chromatogram and the epoxy value of the glycidyl group-containing vinyl resin (E) is not less than 0.003 Eq/100 g and not more than 0.022 Eq/100 g; and the mass ratio (C/E) of the carboxyl group-containing vinyl resin (C) to the glycidyl group-containing vinyl resin (E) is from 87/13 to 99/1.

The aforementioned binder resin for color toners may contain a block copolymer including: a block comprising a sequence of ethylenic hydrocarbon derived constituent units and/or conjugated diene type hydrocarbon-derived constituent units, and a block comprising a sequence of styrene-derived constituent units, and/or the hydrogenated product of the block copolymer, in an amount of not less than 0.05 mass % and not more than 0.6 mass % based on 100 mass % of the carboxyl group-containing vinyl resin (C).

Furthermore, the present invention provides a method for producing the aforementioned binder resin for color toners including a polymerizing the low molecular weight vinyl resin (L) in the presence of at least one of releasing agents having a melting point of not lower than 60 degrees centigrade and not higher than 120 degrees centigrade, and an amount of not less than 2 mass % and not more than 13 mass % based on 100 mass % of the constituent monomer of the low molecular weight vinyl resin (L).

Furthermore, the present invention provides a method for producing the aforementioned binder resin for color toners including a melt-kneading at least one of the carboxyl group-containing vinyl resins (C) and at least one of the glycidyl group-containing vinyl resins (E) at a temperature range of not lower than 140 degrees centigrade and not higher than 210 degrees centigrade, and reacting a carboxyl group with a glycidyl group.

Besides, the present invention provides a color toner containing at least the aforementioned binder resin for color toners, a coloring agent and a charge controlling agent.

The aforementioned color toner may be obtained by a grinding method.

In the aforementioned color toner, the storage modulus G' at 160 degrees centigrade may be not less than 100 Pa and less than 800 Pa measured at a frequency of 6.28 rad/sec.

According to the present invention, there are provided a binder resin for color toners and a color toner excellent in balancing the gloss, durability and various properties required for a toner.

BEST MODE FOR CARRYING OUT THE INVENTION

The present invention will be described in more detail below.

In the present invention, the term "polymerization" may include the meaning of copolymerization, and the term "polymer" may have the meaning of a copolymer.

The binder resin for color toners of the present invention contains a carboxyl group-containing vinyl resin (C), a glycidyl group-containing vinyl resin (E) and a reaction product thereof, and a releasing agent. It is possible to obtain a toner excellent in balancing the fixing properties and offset resistance by containing such a resin. Furthermore, in a reaction product of the carboxyl group-containing vinyl resin (C) and the glycidyl group-containing vinyl resin (E), molecules at the reaction site may move relatively freely. Therefore, even though the molecular weight increases, moderate elasticity can be imparted without excessively increasing the elasticity. Furthermore, it is possible to obtain a toner excellent in unprecedented balancing gloss and offset resistance because of the releasing agent contained in the toner.

Furthermore, in the binder resin for color toners of the present invention, the storage modulus G' at 160 degrees centigrade is not less than 20 Pa and less than 800 Pa, preferably not less than 30 Pa and less than 700 Pa and further preferably not less than 50 Pa and less than 600 Pa measured at a frequency of 6.28 rad/sec. Herein, in a general grinded toner for monochrome use of the related art, a resin has been designed so as to increase the storage modulus at a temperature higher than 160 degrees centigrade for the purpose of achieving both the low temperature fixing properties and hot offset resistance. However, in case of high elasticity at a high temperature, offset resistance becomes excellent, whereas there is a problem of deterioration of the gloss. That is, when the general grinded toner for monochrome use is used for a color toner, even though a smooth surface is temporarily formed by using a heat roll or the like during fixation of the toner, the printed surface becomes uneven due to the restoring force on the surface attributable to the resin elasticity. As a result, there is a problem of reduction of the gloss. In particular, a binder resin for monochrome use of the related art contains lots of high molecular component and gel portion so that the elastic modulus at a temperature of 160 degrees centigrade becomes excessively high. Thus, the gloss is reduced. When it is used for a color toner, there has been a problem such that the gloss is impaired. In order to achieve the gloss, it is important to have a resin with low elasticity. In the present invention, it is possible to obtain a binder resin for color toners excellent in the gloss because of the storage modulus G' in a predetermined range.

Meanwhile, in the binder resin for color toners of the present invention, the tetrahydrofuran (THF) soluble portion in the binder resin has a main peak in the molecular weight region of not less than 20,000 and less than 40,000 and preferably in the molecular weight region of not less than 20,000 and less than 37,000 in the molecular weight distribution measured by gel permeation chromatography (GPC). In the binder resin of the present invention, a balance among the gloss and durability and other various properties of the toner becomes excellent by having a main peak in this region. The toner durability is greatly affected by the peak molecular weight of the low molecular weight component. When the peak molecular weight is excessively low, the toner easily becomes brittle and the durability tends to be worsened, while when it is high, the durability is improved. However, when the peak molecular weight of the low molecular weight component is excessively high, the toner is excessively hard so that the toner is hardly ground in the production thereof. As a result, the productivity might possibly be lowered. Furthermore, the storage modulus and loss modulus become high during melting so that the fixing properties and the gloss are damaged in some cases. Therefore, when the THF soluble portion is within the above region, deterioration of the durability can be prevented in the production of the toner and an excellent balance among the gloss and other various properties can be exhibited.

Meanwhile, the binder resin for color toners of the present invention contains at least one of releasing agent having a melting point of not lower than 60 degrees centigrade and not higher than 120 degrees centigrade. The content of the releasing agent is not less than 3.5 mass % and not more than 12 mass % and preferably not less than 4 mass % and not more than 10 mass % based on 100 mass % of the total amount of the carboxyl group-containing vinyl resin (C), the glycidyl group-containing vinyl resin (E) and a reaction product thereof. Further, the melting point of the releasing agent is preferably not lower than 60 degrees centigrade and not higher than 120 degrees centigrade, and further preferably not lower than 70 degrees centigrade and not higher than 115 degrees centigrade. When the content of the releasing agent is excessively small, hot offset easily occurs and the gloss is further easily deteriorated presumably because of the occurrence of micro offset phenomenon. On the other hand, when the content of the releasing agent is excessively high, the releasing agent component is easily agglomerated in the resin or the toner. As a result, a wax is easily fallen off from the toner in the production of the toner so that contamination of the inside of a device or deterioration of the storage stability might possibly be caused. Furthermore, the toner is attached inside of the device in the production of the toner so that the productivity is lowered in some cases. On the other hand, when the melting point is excessively low, the storage stability of the toner is worsened in some cases. When the melting point is excessively high, the compatibility of the releasing agent component with the resin is reduced so that the fixing properties are easily insufficient. Furthermore, by increasing the resin elasticity, the gloss might possibly be deteriorated. Accordingly, the binder resin of the present invention can achieve an excellent balance among the gloss, offset resistance, storage stability, productivity and other various properties by a releasing agent having the melting point and the content within the above region.

The aforementioned releasing agent is preferably dispersed in the binder resin. More preferably, the aforementioned releasing agent is finely dispersed in the binder resin in a state that an average diameter is not more than 1 micrometer. Thus the releasing agent having a low melting point is internally added in the resin and finely dispersed, whereby it is possible to improve offset resistance while retaining the storage stability and cleaning properties.

In the present invention, the integrated value of the content of the tetrahydrofuran (THF) soluble portion in the binder resin in the molecular weight region of not more than 2,000 is preferably not more than 7.0 mass % and more preferably not more than 6.5 mass % based on the total THF soluble portion. Furthermore, the lower limit of the integrated value of the content is not particularly limited, but it is, for example, not less than 2 mass %. A releasing agent having a low melting point is internally added to the binder resin of the present invention. The releasing agent having a low melting point is compatible with the low molecular weight component having a molecular weight of not more than 2,000 so that the entire binder resin is easily plasticized. As a result of the compatibility, deterioration of the storage stability or contamination of the inside of a device easily occurs. Accordingly, the low molecular weight component having a molecular weight of not more than 2,000 is preferably contained in a smaller amount. When the low molecular weight component is within the above range, compatibility of the low molecular weight component with the releasing agent can be prevented. As a result, the storage stability of the toner can be improved and contamination of the inside of a device can be prevented.

In the binder resin for color toners of the present invention, the weight-average molecular weight (Mw) is preferably not more than 170,000 and more preferably not less than 40,000 and not more than 165,000. When the weight-average molecular weight (Mw) is within the above range, a toner excellent in balancing the fixing properties, the toner productivity and the gloss is obtained. In particular, when Mw is excessively high, the elasticity of the melted toner becomes large and the gloss is easily damaged. So, Mw is preferably within the above range.

Besides, in the binder resin for color toners of the present invention, the weight-average molecular weight (Mw)/the number-average molecular weight (Mn) is preferably from 5 to 40 and more preferably not less than 6 and not more than 25. When Mw/Mn is within the above range, it is possible to obtain a binder resin excellent in balancing offset resistance and various properties of the color toner.

Meanwhile, in the binder resin for color toners of the present invention, the content of a volatile component remained in the binder resin is preferably not more than 200 ppm and more preferably not more than 190 ppm. Besides, the lower limit of the content of the residual volatile component is not particularly limited, but it is, for example, not less than 10 ppm. When the content of the residual volatile component is excessively high, deterioration of the storage stability or contamination of the inside of a device is easily caused presumably because the compatibility of the releasing agent having a low melting point is further accelerated. Accordingly, when the content of the residual volatile component is within the aforementioned range, it is preferable because the storage stability and cleaning properties of the toner become excellent. Besides, within the above range, it is preferable because attachment of the toner onto a toner production facility is suppressed and the toner productivity is thus improved as well. Besides, one of preferable reasons is that odor during toner printing is also suppressed.

The binder resin for color toners of the present invention has a softening point of not more than 130 degrees centigrade, preferably not lower than 90 degrees centigrade and not higher than 127 degrees centigrade and more preferably not lower than 100 degrees centigrade and not higher than 123 degrees centigrade. In case of a color toner, control of the softening point is also important in addition to control of the storage modulus. The softening point represents the deformability of the resin due to heat under a load, and is an index of the deformability of the toner due to the pressure and heat while passing a fixing unit. Therefore, as the softening point is lower, the printed surface is smoothed while passing the fixing unit and the gloss of the toner is easily improved. When the softening point is within the aforementioned range, a binder resin excellent in balancing the gloss and various properties suited for use in color toners is obtained.

Hereinafter, the carboxyl group-containing vinyl resin (C) and the glycidyl group-containing vinyl resin (E) contained in the binder resin for color toners of the present invention will further be described in detail.

<Carboxyl Group-containing Vinyl Resin (C)>

The carboxyl group-containing vinyl resin (C) is obtained by using a known polymerization method employing at least one of carboxyl group-containing monomers, at least one of styrene based monomers and at least one of acrylic based monomers (including methacrylic based monomers, hereinafter the same).

Examples of the carboxyl group-containing monomer in the present invention include acrylic acid, methacrylic acid, maleic anhydride, maleic acid, fumaric acid, cinnamic acid, mono esters of an unsaturated dibasic acid such as methyl fumarate, ethyl fumarate, propyl fumarate, butyl fumarate, octyl fumarate, methyl maleate, ethyl maleate, propyl maleate, butyl maleate, octyl maleate and the like. Preferably used are acrylic acid, methacrylic acid, fumaric acid, methyl fumarate, ethyl fumarate, propyl fumarate, butyl fumarate and octyl fumarate. Particularly preferably used are acrylic acid and methacrylic acid.

Examples of the styrene based monomer to be used in the present invention include styrene, p-methylstyrene, m-methylstyrene, o-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene and the like. Particularly preferably used is styrene.

Examples of the acrylic based monomer to be used in the present invention include acrylic esters such as methyl acrylate, ethyl acrylate, propyl acrylate, butyl acrylate, octyl acrylate, cyclohexyl acrylate, stearyl acrylate, benzyl acrylate, furfuryl acrylate, hydroxyethyl acrylate, hydroxybutyl acrylate, dimethylaminomethyl acrylate, dimethylaminoethyl acrylate and the like; methacrylic esters such as methyl methacrylate, ethyl methacrylate, propyl methacrylate, butyl methacrylate, octyl methacrylate, cyclohexyl methacrylate, stearyl methacrylate, benzyl methacrylate, furfuryl methacrylate, hydroxyethyl methacrylate, hydroxybutyl methacrylate, dimethylaminomethyl methacrylate, dimethylaminoethyl methacrylate and the like; and amides such as acrylonitrile, acrylamide, methacrylonitrile, methacrylamide, N-substituted acrylamide, N-substituted methacrylamide and the like. Among these, preferably used are acrylic esters, methacrylic esters, acrylonitrile and methacrylonitrile. Particularly preferably used are butyl acrylate, methyl methacrylate, butyl methacrylate and hydroxyethyl acrylate.

In the present invention, in addition to the aforementioned monomers, there may also be used diesters of an unsaturated dibasic acid such as dimethyl fumarate, dibutyl fumarate, dioctyl fumarate, dimethyl maleate, dibutyl maleate, dioctyl maleate and the like as monomers.

A crosslinking monomer having two or more double bonds may be used, as necessary, for the carboxyl group-containing vinyl resin (C) of the present invention as a monomer. Examples of the crosslinking monomer include aromatic divinyl compounds such as divinyl benzene, divinyl naphthalene and the like; diacrylate compounds and methacrylate compounds thereof such as ethylene glycol diacrylate, 1,3-butylene glycol diacrylate, 1,4-butanediol diacrylate, 1,5-pentanediol diacrylate, 1,6-hexanediol diacrylate, neopentylglycol diacrylate, diethylene glycol diacrylate, triethylene glycol diacrylate, tetraethylene glycol diacrylate, polyoxyethylene(2)-2,2-bis(4-hydroxyphenyl)propane diacrylate, polyoxyethylene(4)-2,2-bis(4-hydroxyphenyl)propane diacrylate and the like; and polyfunctional crosslinking monomers and methacrylate compounds thereof such as pentaerythritol triacrylate, trimethylolethane triacrylate, trimethylolpropane triacrylate, tetramethylolmethane tetraacrylate and the like. When these crosslinking monomers are used, the content of the crosslinking monomer is preferably less than 0.5 mass % based on 100 mass % of other monomers contained in the carboxyl group-containing vinyl resin (C). When the content of the crosslinking monomer is excessively high, a crosslinked body is easily produced by the reaction of a carboxyl group with a glycidyl group to be described below. In order to suppress production of such a crosslinked body, to suppress increasing the elasticity at a high temperature and to suppress deterioration of the gloss, the content of the crosslinking monomer is preferably within the above range.

<Glycidyl Group-containing Vinyl Resin (E)>

Besides, the glycidyl group-containing vinyl resin (E) may be obtained by a known polymerization method employing at least one of glycidyl group-containing monomers and at least one of other monomers. As the monomer constituting the glycidyl group-containing vinyl resin (E), there can be exemplified the aforementioned monomers in addition to the glycidyl group-containing monomers.

The THF soluble portion of the glycidyl group-containing vinyl resin (E) has a peak preferably in the molecular weight region of not less than 20,000 and not more than 80,000, more preferably in the molecular weight region of not less than 30,000 and not more than 70,000 and further preferably in the molecular weight region of not less than 40,000 and not more than 60,000 in the GPC chromatogram. Furthermore, the epoxy value of the glycidyl group-containing vinyl resin (E) is not less than 0.003 Eq/100 g and not more than 0.022 Eq/100 g, more preferably not less than 0.004 Eq/100 g and not more than 0.015 Eq/100 g and further preferably not less than 0.006 not more than 0.013 Eq/100 g. In the binder resin, when the peak molecular weight and the epoxy value of the glycidyl group-containing vinyl resin (E) is not less than the above lower limit, the durability becomes excellent and the feature of maintaining development is enhanced when it is used for a toner. Furthermore, at the same time, by the reaction of the carboxyl group-containing vinyl resin (C) with the glycidyl group-containing vinyl resin (E), the molecular weight of the high molecular weight component further increases and appropriate elasticity is imparted to the binder resin so that offset resistance performance becomes excellent. When the peak molecular weight is excessively small or the epoxy value is excessively small, elasticity of the binder resin is not sufficient and offset resistance becomes deteriorated in some cases. On the other hand, when the peak molecular weight is excessively high or the epoxy value is excessively high, elasticity of the binder resin becomes excessively high so that the gloss is deteriorated in some cases. In the present invention, the epoxy value refers to mole of the epoxy group present in 100 g of the resin, and it can be measured in accordance with JIS K-7236.

Examples of the glycidyl group-containing monomer in the present invention include glycidyl acrylate, β-methyl glycidyl acrylate, glycidyl methacrylate, β-methyl glycidyl methacrylate and the like, and preferably used are glycidyl methacrylate and β-methyl glycidyl methacrylate.

The glycidyl group-containing vinyl resin (E) may not necessarily be single of the glycidyl-containing vinyl resins, and two or more glycidyl group-containing vinyl resins may be used. In that case, the glycidyl group-containing vinyl resin (E) may preferably satisfy the above properties as a whole. Further, to produce a single polymer, the glycidyl group-containing monomer is added in the middle of polymerization or added separately at the beginning and end of polymerization, whereby it is also possible to keep the width of the glycidyl group in the molecules.

Besides, it is preferable that the carboxyl group-containing vinyl resin (C) of the present invention contains a high molecular weight vinyl resin (H) and a low molecular weight vinyl resin (L).

The ratio (H/L) of the high molecular weight vinyl resin (H) to the low molecular weight vinyl resin (L) in the carboxyl group-containing vinyl resin (C) is preferably from 10/90 to 30/70 and more preferably from 15/85 to 25/75 from the viewpoint of a general balance among the toner productivity, fixing properties, offset resistance, durability and the like, in addition to the gloss for the color toner. When the ratio of the high molecular weight vinyl resin (H) is high, offset resistance and durability are improved when it is used for a toner. On the other hand, the ratio of the high molecular weight vinyl resin (H) is preferably not more than a predetermined value from the viewpoint of improvement of the gloss. Accordingly, when H/L is within the above range, it is possible to produce a color toner excellent in balancing the above performances.

In the carboxyl group-containing vinyl resin (C), the acid value is preferably not less than 6 mgKOH/g and not more than 30 mgKOH/g, more preferably not less than 7 mgKOH/g and not more than 28 mgKOH/g and further preferably not less than 8 mgKOH/g and not more than 26 mgKOH/g. When the acid value is not less than the above lower limit, the appropriate elasticity can be imparted to the binder resin by the reaction with the glycidyl group-containing vinyl resin (E) so that offset resistance becomes excellent when it is used for a toner. When the acid value is excessively high, excessive elasticity is imparted to the binder resin and the gloss is impaired when it is used for a toner in some cases. Accordingly, the acid value is preferably within the above range.

<High Molecular Weight Vinyl Resin (H)>

In the present invention, the high molecular weight vinyl resin (H) contained in the carboxyl group-containing vinyl resin (C) contains the THF soluble portion having a peak preferably in the molecular weight region of not less than 150,000 and less than 350,000 and more preferably in the molecular weight region of not less than 170,000 and less than 320,000 in the GPC chromatogram. When the peak molecular weight is excessively small, the elasticity of the binder resin is insufficient without sufficiently increasing the molecular weight in the reaction with the glycidyl group-containing vinyl resin (E) in some case. Accordingly, in order to prevent deterioration of offset resistance, the peak molecular weight is preferably not less than the above lower limit. Furthermore, when the peak molecular weight is excessively high, a crosslinked structure is excessively formed with ease by the reaction with the glycidyl group-containing vinyl resin (E). Accordingly, in order to suppress deterioration of the gloss when it is used for a toner, the peak molecular weight is preferably not more than the above upper limit.

In the high molecular weight vinyl resin (H), the acid value (AVH) is preferably not less than 10 mgKOH/g and not more than 26 mgKOH/g. The acid value is preferably within the above range from the viewpoint of a balance among the gloss and various properties such as the fixing properties, offset resistance and the like of the toner. When the acid value is not less than the above lower limit, the appropriate elasticity can be imparted to the binder resin by the reaction with the glycidyl group-containing vinyl resin to be described below so that offset resistance of the toner becomes excellent. On the other hand, when the acid value is not more than the above upper limit, it is possible to prevent the reaction with the glycidyl group-containing vinyl resin from excessively taking place to excessively increase its viscosity, and it is possible to prevent the loss modulus in the fixing temperature region of the toner from becoming excessively high. As a result, the gloss of the toner becomes excellent. Incidentally, in the present invention, the acid value refers to mg of potassium hydroxide necessary to neutralize 1 g of the resin.

The high molecular weight vinyl resin (H) may not necessarily be a single polymer, and two or more high molecular weight vinyl resins may also be used. In that case, the high molecular weight vinyl resin (H) may preferably satisfy the above properties as a whole. Further, to produce a single polymer, the carboxyl group-containing monomer is added in the middle of polymerization or added separately at the beginning and end of polymerization, whereby it is also possible to keep the width of the distribution of the carboxyl group in the molecules.

<Low Molecular Weight Vinyl Resin (L)>

In the present invention, the low molecular weight vinyl resin (L) contained in the carboxyl group-containing vinyl resin (C) contains the THF soluble portion having a peak preferably in the molecular weight region of not less than 20,000 and less than 40,000 and more preferably in the molecular weight region of not less than 21,000 and less than 36,000 in the GPC chromatogram. When the peak molecular weight is not less than the above lower limit, cleaning properties, storage stability and durability of the toner can be maintained excellent. When the peak molecular weight is not more than the above upper limit, the fixing performance can be maintained excellent.

In the low molecular weight vinyl resin (L), the acid value (AVL) is preferably not less than 6 mgKOH/g and not more than 30 mgKOH/g. When the acid value (AVL) is within the above region, excellent durability, fixing performance, gloss and offset resistance performance are exhibited. Herein, the durability of the toner is improved presumably by increased molecular weight of the low molecular weight vinyl resin which is reacted with the glycidyl group-containing vinyl resin (E) or a hydrogen bond of the carboxyl group. Furthermore, the fixation performance is easily improved due to improvement of the affinity with paper. Furthermore, when the acid value is within the above range, the reactivity of the glycidyl group-containing vinyl resin (E) with the high molecular weight vinyl resin (H) can be prevented from being excessively increased so that deterioration of the gloss of the toner can be prevented.

The low molecular weight vinyl resin (L) may not necessarily be a single polymer, and two or more low molecular weight vinyl resins may be used. In that case, the low molecular weight vinyl resin (L) may preferably satisfy the above properties as a whole. Further, to produce a single polymer, the carboxyl group-containing monomer is added in the middle of polymerization or added separately at the beginning and end of polymerization, whereby it is also possible to keep the width of the distribution of the carboxyl group in the molecules.

Meanwhile, the binder resin for color toners of the present invention may further contain a block copolymer including: a block comprising a sequence of ethylenic hydrocarbon derived constituent units and/or conjugated diene type hydrocarbon-derived constituent units, and a block comprising a sequence of styrene-derived constituent units, and/or the hydrogenated product of the block copolymer. The content of the block copolymer and hydrogenated block copolymer is preferably not less than 0.05 mass % and not more than 0.6 mass % and more preferably not less than 0.1 mass % and not more than 0.5 mass % based on 100 mass % of the carboxyl group-containing vinyl resin (C). When the content is within the above range, the releasing agent can be finely dispersed in the binder resin without impairing storage stability, fluidity and the like of the toner. Therefore, a toner excellent in cleaning properties is easily achieved.

In order to obtain these block copolymers, there may be used one or more kinds selected from ethylenic hydrocarbons such as ethylene, propylene, 1-butene, 2-butene, isobutylene, 1-pentene, 2-pentene, 2-methyl-1-butene, 3-methyl-1-butene, 2-methyl-2-butene, 1-hexene, 2,3-dimethyl-2-butene or the like, and conjugated diene based hydrocarbons such as butadiene, isoprene or the like. The block copolymer is produced by using a reactive group of a block copolymer obtained in accordance with a known living anionic polymerization or a living cationic polymerization, and then blocking this reactive group with styrene. However, the production method is not restricted thereto and other conventionally known methods may also be employed. In addition, some kinds of the aforementioned block copolymers have unsaturated double bonds; the block copolymer may be used as a hydrogenated product obtained by reacting the unsaturated double bonds of the block copolymer with hydrogen in accordance with a known process.

Examples of a commercial product used for the aforementioned block copolymer include Kraton (styrene-ethylene/butylene-styrene based block copolymer (SEBS), styrene-butadiene-styrene based block copolymer, styrene-isoprene-styrene based block copolymer, styrene-ethylene/propylene-styrene based block copolymer or styrene-ethylene/propylene based block copolymer) produced by Kraton Polymer Co., Ltd., Septon (styrene-ethylene/propylene based block copolymer or hydrogenated styrene-isoprene based block copolymer) produced by Kuraray Co., Ltd. and Tufprene (styrene-butadiene based block copolymer) produced by Asahi Kasei Co., Ltd. and the like.

In the present invention, as a method for producing the carboxyl group-containing vinyl resin (C) and the glycidyl group-containing vinyl resin (E), there can be adopted any of known polymerization methods such as solution polymerization, bulk polymerization, suspension polymerization, emulsion polymerization and the like, or the combination thereof. Solution polymerization, bulk polymerization and the combination thereof are suitably adopted from the viewpoints of adjustment of the molecular weight distribution, mixing properties of the high molecular weight vinyl resin (H) and the low molecular weight vinyl resin (L), and convenience of distribution adjustment of the carboxyl group and the glycidyl group.

The carboxyl group-containing vinyl resin (C) may be obtained by polymerizing each of the high molecular weight vinyl resin (H) and the low molecular weight vinyl resin (L) alone in advance, and then mixing these resins in the melt state or the solution state. Further, it may be obtained by polymerizing any one of the high molecular weight vinyl resin (H) or the low molecular weight vinyl resin (L) alone, and then polymerizing the other vinyl resin in the presence of the former vinyl resin.

Examples of the solvent used for solution polymerization include aromatic hydrocarbons such as benzene, toluene, ethylbenzene, xylene, cumene and the like. These may be used alone or a mixture thereof may be used, and preferably used is xylene.

The low molecular weight vinyl resin (L) easily contains lots of low molecular weight component having a molecular weight of not more than 2,000 as compared to other resin components such as the high molecular weight vinyl resin (H) or the glycidyl group-containing vinyl resin (E). Accordingly, to produce the low molecular weight vinyl resin (L) by solution polymerization, a solvent is preferably used in an amount of not less than 20 mass parts and not more than 70 mass parts and further preferably not less than 35 mass parts and not more than 55 mass parts based on 100 mass parts of the constituent monomer in order to reduce the low molecular weight component having a molecular weight of not more than 2,000.

Polymerization may be carried out by using a polymerization initiator or so-called thermal polymerization may be carried out without using a polymerization initiator. As a polymerization initiator, any polymerization initiators can be usually used as far as they can be used as radical polymerization initiators. Examples thereof include azo type initiators such as 2,2'-azobisisobutyronitrile, 2,2'-azobis(4-methoxy-2,4-dimethylvaleronitrile), dimethyl-2,2'-azobisisobutyrate, 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile, 2,2'-azobis(2-methyl-propane) and the like; ketone peroxides such as methylethylketone peroxide, acetylacetone peroxide, cyclohexanone peroxide and the like; peroxy ketals such as 1,1-bis(t-butylperoxy)-3,3,5-trimethylcyclohexane, 1,1-bis(butylperoxy)cyclohexane, 2,2-bis(t-butylperoxy)butane and the like; hydroperoxides such as t-butyl hydroperoxide, cumene hydroperoxide, 1,1,3,3-tetramethylbutyl hydroperoxide and the like; dialkyl peroxides such as di-t-butyl peroxide, t-butylcumyl peroxide, di-cumyl peroxide, 2,5-dimethyl-2,5-di(t-butylperoxy)hexane, α,α'-bis(t-butylperoxyisopropyl)benzene and the like; diacyl peroxides such as isobutyryl peroxide, octanoyl peroxide, decanoyl peroxide, lauroyl peroxide, 3,5,5-trimethylhexanoyl peroxide, benzoyl peroxide, m-toluoyl peroxide and the like; peroxydicarbonates such as diisopropyl peroxydicarbonate, di-2-ethylhexyl peroxydicarbonate, di-n-propyl peroxydicarbonate, di-2-ethoxyethyl peroxycarbonate, di-methoxyisopropyl peroxydicarbonate, di(3-methyl-3-methoxybutyl)peroxycarbonate and the like; sulfonyl peroxides such as acetylcyclohexyl sulfonyl peroxide and the like; and peroxyesters such as t-butyl peroxyacetate, t-butyl peroxyisobutyrate, t-butyl peroxyneodecanoate, cumyl peroxyneodecanoate, t-butyl peroxy-2-ethylhexanoate, t-butyl peroxy laurate, t-butyl peroxy benzoate, t-butyl peroxy isopropyl carbonate, di-t-butyldiperoxy isophthalate and the like. These initiators may be used singly or in combination of two or more kinds. The type and amount thereof can be properly selected depending on the reaction temperature, concentration of the monomer and the like. The polymerization initiator is usually used in an amount of 0.01 to 10 mass % per 100 mass % of the monomer in use.

The binder resin of the present invention contains, as described above, at least the carboxyl group-containing vinyl resin (C) and the glycidyl group-containing vinyl resin (E). The ratio (C/E) of the carboxyl group-containing vinyl resin (C) to the glycidyl group-containing vinyl resin (E) is preferably from 87/13 to 99/1 and more preferably from 90/10 to 97/3 in terms of the mass ratio from the viewpoint of offset resistance. When the ratio of the glycidyl group-containing vinyl resin (E) is excessively high, the reaction with the carboxyl group-containing vinyl resin (C) might possibly excessively proceeds depending on the epoxy value and the molecular weight of the glycidyl group-containing vinyl resin (E) though. As a result, the elastic modulus becomes excessively high so that the gloss might possibly be reduced. Furthermore, when the ratio of the glycidyl group-containing vinyl resin (E) is excessively low, the reaction of the carboxyl group-containing vinyl resin (C) with the glycidyl group-containing vinyl resin (E) is not sufficient so that offset resistance might possibly be reduced.

As a method for reacting the carboxyl group-containing vinyl resin (C) with the glycidyl group-containing vinyl resin (E), preferably used is a method involving mixing at least one of the carboxyl group-containing vinyl resins (C) and at least one of the glycidyl group-containing vinyl resins (E) in the melt state for the reaction. As such a method, any conventionally known methods may be used. For example, a method involving introducing both resins into a reaction container equipped with a stirrer or the like and heating the resulting material for the reaction in the melt state, a method involving reacting both resins in the presence of a solvent and removing the solvent or the like, can be adopted. In particular, preferably used is a method employing a twin screw kneader. Concrete examples thereof include a method involving mixing powders of the carboxyl group-containing vinyl resin (C) and the glycidyl group-containing vinyl resin (E) by the use of a Henschel mixer or the like, and then conducting melt-kneading and reaction using a twin screw kneader, and a method involving feeding the carboxyl group-containing vinyl resin (C) and the glycidyl group-containing vinyl resin (E) in the melt state to a twin screw kneader for conducting melt-kneading and reaction. The temperature for conducting melt-kneading and reaction is different depending on the type of the carboxyl group-containing vinyl resin (C) and the glycidyl group-containing vinyl resin (E), but it is in the range of 140 degrees centigrade to 210 degrees centigrade and preferably in the range of 150 degrees centigrade to 200 degrees centigrade. When the reaction temperature is excessively low, the reaction speed might possibly be lowered. As a result, the reaction is not sufficiently carried out so that offset resistance might possibly be insufficient. On the other hand, when the reaction temperature is excessively high, depolymerization occurs so that the volatile content remained in the binder resin or the low molecular weight component having a molecular weight of not more than 2,000 might possibly be increased. As a result, defects such as deterioration of storage stability, contamination of the inside of a device, the occurrence of odor and the like easily occur.

As a method for melt-kneading and reacting using a twin screw kneader, water is injected into a twin screw kneader in an amount of not less than 0.5 mass parts and not more than 2.5 mass parts and preferably not less than 1.0 mass parts and not more than 2.0 mass parts based on 100 mass parts of the resin at a pressure of not less than 1 MPa and not more than 3 MPa and preferably not less than 1.7 MPa and not more than 2.3 MPa. Then, water and the volatile component are preferably removed by reducing the pressure to 0.001 MPa to 0.200 MPa and preferably 0.050 MPa to 0.150 MPa from a pressure reducing port installed at an outlet side from a water inlet. Incidentally, in the present invention, the pressure refers to a gauge pressure, that is, a value subtracting an atmospheric pressure from an absolute pressure based on a vacuum otherwise particularly specified. By having the injection pressure within the above range, water is fully mixed in the resin so that the volatile component is easily removed when reducing the pressure. Furthermore, when the amount of water injected is excessively small, the volatile component cannot be fully removed in some cases. On the other hand, when the amount of water injected is excessively high, the state of water dispersed in the resin is deteriorated and as a result, the volatile component is hardly removed in some cases. Furthermore, the volatile component can be fully removed from the resin by having the vacuum pressure within the above range. Besides, such a method is preferable because the volatile content remained in the binder resin can be not more than 200 ppm and the low molecular weight component having a molecular weight of not more than 2,000 can be reduced at the same time.

For the purpose of improving dispersion of the releasing agent in the toner, the releasing agent contained in the binder resin of the present invention is preferably added in the following manner. That is, in a step of producing the carboxyl group-containing vinyl resin (C), the releasing agent is added in the co-presence of a solvent and a block copolymer including: a block comprising a sequence of ethylenic hydrocarbon derived constituent units and/or conjugated diene type hydrocarbon-derived constituent units, and a block comprising a sequence of styrene-derived constituent units, and/or the hydrogenated product of the block copolymer, for removing the solvent. It is preferable that the carboxyl group-containing vinyl resin (C) containing a releasing agent is produced in this way. Even when the aforementioned melt-kneading and reaction are carried out thereafter, the releasing agent can be in an excellent dispersion state. Furthermore, the carboxyl group-containing vinyl resin (C) containing a releasing agent may be produced by polymerizing the low molecular weight vinyl resin (L) containing a releasing agent in the presence of at least one of releasing agents having a melting point of not lower than 60 degrees centigrade and not higher than 120 degrees centigrade, and an amount of not less than 2 mass % and not more than 13 mass % based on 100 mass % of the constituent monomer of the low molecular weight vinyl resin (L), and using the polymerized low molecular weight vinyl resin. Such a method is preferable for dispersion of the releasing agent is improved. Furthermore, during polymerization of the low molecular weight vinyl resin (L) containing a releasing agent, a block copolymer including: a block comprising a sequence of ethylenic hydrocarbon derived constituent units and/or conjugated diene type hydrocarbon-derived constituent units, and a block comprising a sequence of styrene-derived constituent units, and/or the hydrogenated product of the block copolymer, may be contained.

The thus-obtained resin is cooled and ground to give a binder resin for a toner. As a method for cooling and grinding, any of conventionally known methods may be adopted, and as a method for cooling, a steel belt cooler or the like may also be used for rapid cooling.

The color toner of the present invention contains at least the binder resin for color toners of the present invention, a coloring agent and a charge controlling agent.

The color toner of the present invention is produced according to a conventionally known method. The color toner of the present invention is preferably obtained by a grinding method. For example, at least the binder resin for color toners of the present invention, a coloring agent and a charge controlling agent are added, and as necessary other additives such as a releasing agent or the like are added, which are sufficiently mixed using a powder mixer. Thereafter, the resulting mixture is melt-kneaded using a kneading machine such as a heat roll, a kneader or an extruder for sufficiently mixing individual constituent components. The melt-kneaded material is cooled, and then ground and classified to collect particles having a particle diameter of ordinarily 4 to 15 micrometers. The collected particles are coated with a surface treatment agent according to the powder mixing method, to obtain a toner. Or, as necessary, the toner may be subjected to spheroidizing treatment using a surface treatment device or the like. As a surface treatment method, there can be mentioned, for example, a method of spheroidizing the toner by inflowing it in a hot air jet, a method of chamfering the toner by mechanical impact and the like.

The color toner of the present invention has a glass transition temperature (Tg) obtained according to JIS K-7121 standard is preferably from 45 to 75 degrees centigrade and more preferably from 50 to 65 degrees centigrade. When Tg is excessively low, the storage stability is not sufficient in some cases. When Tg is excessively high, the fixing properties are not sufficient in some cases.

The color toner of the present invention has a softening point of preferably not more than 125 degrees centigrade and further preferably not lower than 90 degrees centigrade and not higher than 120 degrees centigrade from the viewpoint of a balance among the gloss and other performances.

Meanwhile, in the color toner of the present invention, the storage modulus G' at 160 degrees centigrade is preferably not less than 100 Pa and not more than 800 Pa and more preferably not less than 200 Pa and not more than 700 Pa measured at a frequency of 6.28 rad/s. When the storage modulus G' is within the above range, a color toner excellent in balancing the gloss and various properties is obtained.

Furthermore, in the color toner of the present invention, the integrated value of the content of the tetrahydrofuran (THF) soluble portion in the molecular weight region of not more than 2,000 is preferably not more than 7.0 mass % based on the total THF soluble portion from the viewpoints of the storage stability and cleaning properties.

<Releasing Agent>

Any conventionally known releasing agents satisfying the condition of a melting point of not lower than 60 degrees centigrade and not higher than 120 degrees centigrade may be used as the releasing agent which may be used in the present invention. Examples thereof include aliphatic hydrocarbon based wax such as low molecular weight polyethylene, low molecular weight polypropylene, polyolefin copolymer, polyolefin wax, paraffin wax, microcrystalline wax, Fisher-Tropsch wax and the like; oxides of aliphatic hydrocarbon based wax such as oxidized polyethylene wax; vegetable based wax such as candelilla wax, carnauba wax, Japan wax, rice wax and jojoba wax; animal based wax such as bee wax, lanoline and whale wax; mineral based wax such as ozokerite, ceresine and petrolatum; wax principally constituted of aliphatic esters such as montanic acid ester and castor wax; and partially or totally deacidified aliphatic esters such as deacidified carnauba wax. Further, examples include saturated linear aliphatic acids such as palmitic acid, stearic acid and montanic acid or long-chain alkyl carboxylic acids having a long-chain alkyl group; unsaturated aliphatic acids such as brassidic acid, eleostearic acid and parinaric acid; saturated alcohols such as stearyl alcohol, eicosyl alcohol, behenyl alcohol, carnaubyl alcohol, ceryl alcohol and melissyl alcohol, or long-chain alkyl alcohol having a long-chain alkyl group; polyhydric alcohols such as sorbitol; aliphatic acid amides such as linoleic amide, oleic amide and lauric amide; saturated aliphatic acid bis amides such as methylene bis stearamide, ethylene bis capramide, ethylene bis lauramide and hexamethylene bis stearamide; unsaturated aliphatic acid amides such as ethylene bis oleamide, hexamethylene bis oleamide, N,N'-dioleyl adipamide and N,N'-dioleyl sebacamide; aromatic based bisamides such as m-xylene bis stearamide and N,N'-distearyl isophthalamide; aliphatic metal salts such as calcium stearate, calcium laurate, zinc stearate and magnesium stearate; wax formed by grafting vinyl based monomers such as a styrene based monomer, an acrylic based monomer, a carboxyl group-containing monomer and a glycidyl group-containing monomer to aliphatic hydrocarbon wax; partially esterified compounds of fatty acids and polyhydric alcohols such as behenic acid monoglyceride; and methyl ester compounds having a hydroxyl group obtained by hydrogenating vegetable oils and fats. Further, examples include an n-paraffin mixture obtained from petroleum fraction or higher aliphatic hydrocarbon having one or more double bonds obtained by an ethylene polymerization method or an olefination method by pyrolysis of petroleum based hydrocarbons; wax having a functional group such as a hydroxyl group, an ester group, a carboxyl group or the like obtained by subjecting polyethylene wax obtained by an ethylene polymerization method or higher aliphatic hydrocarbon obtained by a Fisher-Tropsch synthesis method to liquid-phase oxidation with a molecular oxygen-containing gas in the presence of boric acid and boric anhydride; wax synthesized by a metallocene catalyst such as polyethylene, polypropylene, polybutene, polypentene, polyhexene, polyheptane, polyoctene, ethylene-propylene copolymer, ethylene-butene copolymer and butene-propylene copolymer; and ester group-containing wax obtained by the reaction of a halide of long-chain alkylcarboxylic acid with polyhydric alcohol or condensation with long-chain alkyl carboxylic acid with polyhydric alcohol. These releasing agents may be used singly or in combination of two or more kinds. The binder resin of the present invention contains a releasing agent in an amount of not less than 3.5 mass % and not more than 12 mass % based on 100 mass % of the total amount of the carboxyl group-containing vinyl resin (C), the glycidyl group-containing vinyl resin (E) and a reaction product. These releasing agents are added in the production of the binder resin. However, the above releasing agent may be added in a small amount in the ranges in which the functions are not impaired in the production of the toner.

<Charge Controlling Agent>

It is preferable that the color toner of the present invention contains a charge controlling agent in order to keep a positive electrostatic-charging property or a negative electrostatic-charging property. As a charge controlling agent, conventionally known charge controlling agents may be used. Examples of the positive charge controlling agent include nigrosins and modified products of nigrosin with aliphatic metal salts and the like; quaternary ammonium salts such as tributylbenzylammonium-1-hydroxy-4-naphtosulfonate salt and tetrabutylammonium tetrafluoro borate, and onium salts such as their phosphonium salts that are analogs thereof and the lake pigments thereof; triphenylmethane dyes and lake pigments thereof (laking agents: phosphorus tungstic acid, phosphorus molybdenic acid, phosphorus tungsten molybdenic acid, tannic acid, lauric acid, gallic acid, ferricyanide, ferrocyanide and the like); metal salts of higher fatty acids; diorganotin oxides such as dibutyltin oxide, dioctyltin oxide and dicyclohexyltin oxide; diorganotin borates such as dibutyltin borate, dioctyltin borate and dicyclohexyltin borate; guanidine compounds, imidazole compounds, and imidazolium salts. Further, examples include quaternary ammonium salt group-containing copolymers obtained by a means of quaternization or the like with para-toluenesulfonic acid alkyl ester after copolymerizing dialkylaminoalkyl (meth)acrylate and a styrene based monomer and as necessary an acrylic based monomer. As the negative charge controlling agent, for example, an organic metal complex and a chelate compound are effective, and examples thereof include a mono-azo metal complex, an acetylacetone metal complex, an aromatic hydroxycarboxylic acid metal complex, an aromatic dicarboxylic acid metal complex; aromatic hydroxycarboxylic acid, aromatic monocarboxylic acid or aromatic polycarboxylic acid and metal salts, anhydride, and esters thereof, and bisphenol derivative such as bisphenol. Further, the examples include azo type metal compounds having a coordination center metal selected from the group consisting of Sc, Ti, V, Cr, Co, Ni, Mn and Fe, and cation selected from hydrogen ion, sodium ion, potassium ion and ammonium ion; metal compounds of aromatic hydroxycarboxylic acid derivative and aromatic polycarboxylic acid derivatives having a coordination center metal selected from the group consisting of Cr, Co, Ni, Mn, Fe, Ti, Zr, Zn, Si, B, Ca, Mg, Sr and Al, and cation selected from the group consisting of hydrogen ion, sodium ion, potassium ion, ammonium ion and aliphatic ammonium; (aromatic hydroxycarboxylic acid derivative and aromatic polycarboxylic acid may have an alkyl group, an aryl group, a cycloalkyl group, an alkenyl group, an alkoxy group, an aryloxy group, a hydroxyl group, an alkoxycarbonyl group, an aryloxycarbonyl group, an acyl group, an acyloxy group, a carboxyl group, halogen, a nitro group, a cyano group, an amide group, an amino group or a carbamoyl group as a substituent); and a polymer having a sulfonic acid group-containing monomer such as a copolymer of a sulfonic acid group-containing acrylamide based monomer, a styrene based monomer and an acrylic based monomer as a constituent component. Particularly preferred are salicylic acid based metal compounds containing at least one selected from the group consisting of Ca, Al, Zr, Zn and Cr. These charge controlling agents may be used singly or in combination of two or more kinds. The amount of the charge controlling agent added is preferably from 0.05 to 10 mass %, more preferably from 0.1 to 5 mass % and further preferably from 0.2 to 3 mass % based on 100 mass % of the binder resin, from the viewpoint of a balance between the charge amount and fluidity of the toner. Further, as a method of adding, a method of adding it into the inside of the toner, a method of externally adding, or a combination thereof may be applied.

<Coloring Agent>

The color toner of the present invention contains a coloring agent. As a coloring agent, conventionally known pigments and dyes may be used. Examples of the pigment include mineral fast yellow, navel yellow, Naphthol Yellow S, Hanza Yellow G, Permanent Yellow NCG, Tartrazine Lake, molybdenum orange, Permanent Orange GTR, Pyrazolone Orange, Benzidine Orange G, Permanent Red 4R, Watchung Red calcium salt, eosine lake, Brilliant Carmine 3B, manganese violet, Fast Violet B, Methyl Violet Lake, cobalt blue, Alkali Blue Lake, Victoria Blue Lake, Phthalocyanine Blue, Fast Sky Blue, Indanthrene Blue BC, chrome green, Pigment Green B, Malachite Green Lake, Final Yellow Green G and the like. Examples of the magenta coloring pigment include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, 209, 238; C.I. Pigment Violet 19; C.I. Violet 1, 2, 10, 13, 15, 23, 29, 35 and the like. Examples of the cyan coloring pigment include C.I. Pigment Blue 2, 3, 15, 15:1, 15:2, 15:3, 16, 17; C.I. Acid Blue 6; C.I. Acid Blue 45; copper phthalocyanine pigments whose phthalocyanine skeleton has been substituted with 1 to 5 phthalimide methyl group(s) and the like. Examples of the yellow coloring pigment include C.I. Pigment Yellow 1, 2, 3, 4, 5, 6, 7, 10, 11, 12, 13, 14, 15, 16, 17, 23, 65, 73, 74, 83, 93, 97, 155, 180, 185; C.I. Vat Yellow 1, 3, 20 and the like. Examples of the black pigment include carbon black such as furnace black, channel black, acetylene black, thermal black, lamp black and the like. Examples of the dye include C.I. Direct Red 1; C.I. Direct Red 4; C.I. Acid Red 1; C.I. Basic Red 1; C.I. Mordant Red 30; C.I. Direct Blue 1; C.I. Direct Blue 2; C.I. Acid Blue 9; C.I. Acid Blue 15; C.I. Basic Blue 3; C.I. Basic Blue 5; C.I. Mordant Blue 7; C.I. Direct Green 6; C.I. Basic Green 4; C.I. Basic Green 6; Solvent Yellow 162 and the like. These coloring agents may be used singly or in combination of two or more kinds. The amount of the coloring agent added to the toner is preferably from 0.05 to 20 mass %, more preferably from 0.1 to 15 mass % and further preferably from 0.2 to 10 mass based on 100 mass % of the binder resin.

Meanwhile, the color toner of the present invention may be used as necessary by partially adding, for example, polyvinyl chloride, polyvinyl acetate, polyester, polyvinyl butyral, polyurethane, polyamide, rosin, polymerized rosin, modified rosin, terpene resin, phenolic resin, aromatic petroleum resin, vinyl chloride resin, styrene-butadiene resin, styrene-ethylene-butadiene-styrene block copolymer, styrene-(meth) acrylic copolymer, chromane-indene resin, melamine resin or the like, in the ranges in which the effect of the present invention is not impaired.

<Surface Treatment Agent>

In the color toner of the present invention, a surface treatment agent is preferably present between the toner and a carrier, or between toners by adding a surface treatment agent to the surface of the toner. By adding the surface treatment agent, the powder fluidity, storage stability, electrification stability and environmental stability can be improved, and life of a developing agent can also be improved. As a surface treatment agent, conventionally known surface treatment agents may be used, and examples thereof include fine silica powder, fine titanium oxide powder and hydrophobically modified product. As fine silica powder, there may be used wet silica, dry silica, a complex of dry silica and metal oxide and the like. Fine silica powder subjected to hydrophobic treatment with an organic silicon compound or the like may be further used. As the hydrophobic treatment, for example, a method of treating fine silica powder generated by vapor-phase oxidation of a silicon halogenated compound with a silane compound and with an organic silicon compound and the like can be cited. Examples of the silane compound to be used for the hydrophobic treatment include hexamethyl disilazane, trimethyl silane, trimethyl chlorosilane, trimethyl ethoxysilane, dimethyl dichlorosilane, methyl trichlorosilane, allyldimethyl chlorosilane, allylphenyl dichlorosilane, benzyldimethyl chlorosilane, bromomethyl dimethylchlorosilane, α-chloroethyl trichlorosilane, β-chloroethyl trichlorosilane, chloromethyl dimethylchlorosilane, triorganosilyl mercaptan, trimethylsilyl mercaptan, triorganosilyl acrylate, vinyldimethyl acetoxysilane, dimethyldiethoxy silane, dimethyldimethoxy silane, diphenyldiethoxy silane, hexamethyl disiloxane, 1,3-divinyl tetramethyl disiloxane, 1,3-diphenyl tetramethyl disiloxane and the like. Examples of the organic silicon compound to be used for the hydrophobizing treatment include silicone oils such as dimethyl silicone oil, methylphenyl silicone oil, α-methyl styrene-modified silicone oil, chlorophenyl silicone oil, fluorine-modified silicone oil and the like. Further, fine titanium oxide powder subjected to oil treatment and fine particle of a vinyl resin of 0.03 to 1 micrometer may also be used. As the surface treatment agent in addition thereto, there may also be used a lubricant such as polyethylene fluoride, zinc stearate and polyvinylidene fluoride; an abrasive such as cerium oxide, silicon carbide, strontium titanate, magnetic powder, alumina and the like; and an electroconductivity imparting agent such as carbon black, zinc oxide, antimony oxide, tin oxide and the like. Further, as the shape of the surface treatment agent, there may also be used various shapes such as a particle having a small particle diameter of not more than 100 nano-meters, a particle having a large particle diameter of not less than 100 nano-meters, octahedron shape, hexahedron shape, needle shape, fiber shape and the like. The surface treatment agents may be used singly or in combination of two or more kinds. The amount of the surface treatment agent added is preferably from 0.1 to 10 mass parts and more preferably from 0.1 to 5 mass parts based on 100 mass parts of the toner.

<Carrier>

When the color toner of the present invention is used as a two-component developing agent, conventionally known carriers may be used as a carrier. For example, there may be used particles having a number average particle diameter of 15 to 300 micro-meters composed of metals such as surface-oxidated or non-oxidated iron, cobalt, manganese, chromium, copper, zinc, nickel, magnesium, lithium and rare earths, and alloys thereof or oxides. As the carrier, there may be used carriers with its surface coated by a styrene based resin, an acrylic based resin, a silicone based resin, a polyester resin, a fluorine based resin or the like. Furthermore, there may be used magnetic carriers having a magnetic microparticle dispersed based core obtained by dispersing magnetic microparticles in the resin and a coated layer containing a coated resin to be applied on the surface of the magnetic microparticle dispersed core.

The resulting color toner according to the present invention may be applied to various known development methods. Examples thereof include, though not restricted thereto, a cascade development method, a magnetic brush method, a powder cloud method, a touch-down method, a so-called micro-toning method using, as a carrier, a magnetic toner produced by grinding method, and a so-called bipolar magnetic toner method in which a required amount of toner charges are obtained by the frictional electrification between magnetic toners. The resulting color toner according to the present invention may also be applied to various cleaning methods such as a conventionally known fur brush method, a blade method and the like. Further, the resulting color toner according to the present invention can be applied to various conventionally known fixing methods. Concrete examples thereof include an oil-free heat roll method, an oil-coated heat roll method, a thermal belt fixing method, a flash method, an oven method, a pressure fixing method and the like. It may also be applied to a fixing apparatus using an electromagnetic induction heating method. Further, it may also be applied to an image forming method involving an intermediate transfer step.

EXAMPLES

The present invention is now illustrated in detail below with reference to Examples. However, the present invention is not restricted to these Examples. Furthermore, methods of measuring and judging data are as follows. Further, in Tables, St represents styrene, Mac represents methacrylic acid, BA represents n-butyl acrylate, GMA represents glycidyl methacrylate, and Xy represents xylene.

<Acid Value>

The acid value (AV) in the Example was calculated in the following manner. An accurately weighed sample was dissolved in a mixed solvent of xylene and n-butanol (mass ratio=1:1). The solution was titrated with alcohol of standardized N/10 potassium hydroxide (7 g of special class potassium hydroxide was added to 5 g of ion exchange water, diluted to 1 L (litter) with first class ethyl alcohol, and then titrated with N/10 hydrochloric acid and 1% phenolphthalein solution to determine titer=F) for calculating the acid value from its neutralization amount according to the following equation.

$$\text{Acid value}(\text{mgKOH/g}) = (N/10 \text{ KOH titration amount (ml)} \times F \times 5.61)/(\text{sample g} \times 0.01)$$

<Peak Molecular Weight>

The peak molecular weight in the Example obtained by the GPC (gel permeation chromatography) method is a molecular weight calculated with reference to a calibration curve produced by the use of the monodispersed standard polystyrene. The measurement conditions are as follows.

GPC apparatus: SHODEX GPC SYSTEM-21 (Showa Denko K.K.)
Detector: SHODEX RI SE-31 (Showa Denko K.K.)
Column: 3 of SHODEX GPC KF-807L and 1 of GPC KF-800D (Showa Denko K.K.) are serially connected for use
Solvent: tetrahydrofuran (THF)
Flow rate: 1.2 ml/min.
Sample concentration: 0.002 g-resin/ml-THF
Injected amount: 100 μL The component insoluble in THF was removed from the sample solution by means of a filter right before the measurement. To measure the molecular weight of a toner, 10 mass % of the toner was fully dissolved in 90 mass % of THF, and then 50 mass parts of SIMGON talc and 50 mass parts of titanium (CR-95) were added thereto for carrying out centrifugation. The resulting supernatant liquid was adjusted to a predetermined concentration for measuring the molecular weight.

<Glass Transition Temperature (Tg)>

Tg in the Example was measured using DSC-20 (a product of Seiko Instruments Inc.) according to differential scanning calorimetry (DSC). About 10 mg of a sample was subjected to temperature elevation from −20 to 200 degrees centigrade at a rate of 10 degrees centigrade/min to obtain a curve; in the curve, an intersection between the base line and the inclined line of the endothermic peak was determined; and the Tg of the sample was determined from the intersection. Furthermore, the melting point of the releasing agent was also determined from the endothermic peak using the aforementioned device.

<Softening Point (Tm)>

Tm in the Example was measured by using an elevated flow tester CFT-500 manufactured by Shimadzu Corporation. A sample having a volume of 1 cm$^3$ was melted and flowed under conditions of a diameter of a die pore of 1 mm, a pressure of 20 kg/cm$^2$ and a temperature increase speed of 6 degrees centigrade/min and Tm was determined as the temperatures when the sample is half-size between started and finished flowing.

<Epoxy Value>

The epoxy value was measured in the following procedure. 0.2 to 5 g of a resin sample was weighed accurately and put into a 200-mL Erlenmeyer flask, and then 25 mL of dioxane was added thereto and dissolved therein. 25 mL of a 1/5 normal hydrochloric acid solution (dioxane solvent) was added, and the resulting solution was sealed and fully mixed, and then allowed to stand for 30 minutes. Next, 50 mL of a mixed solution of toluene and ethanol (1:1 volume ratio) was added, and then the reaction solution was titrated with a 1/10 normal aqueous sodium hydroxide solution using cresol red as an indicator. Based on the titration results, the epoxy value (Eq/100 g) was calculated according to the following equation.

$$\text{Epoxy value}(\text{Eq}/100 \text{ g}) = [(B-S) \times N \times F]/(10 \times W)$$

Herein, W refers to the amount of collected sample (g), B refers to the amount of the aqueous sodium hydroxide solution (ml) required for a blank test, S refers to the amount of the aqueous sodium hydroxide solution (ml) required for the test of the sample, N refers to the normality of the aqueous sodium hydroxide solution, and F refers to the titer of the aqueous sodium hydroxide solution.

<Measurement of Viscoelasticity>

The viscoelasticity in the present invention was determined according to the following measurement.

Viscoelasticity apparatus: STRESS TECH Rheometer (a product of ReoLogica Instruments AB)
Measurement mode: Oscillation strain control
Measurement temperature range: 50 to 200 degrees centigrade
Temperature elevation rate: 2 degrees centigrade/min.
Frequency: 1 Hz (6.28 rad/sec)
Gap: 1 mm
Plate: Parallel plates
Stress strain: 1%
Sample shape: Cylindrical shape having a thickness of 1 mm and a diameter of about 20 mm <Quantitative Method of Residual Volatile Component (Internal Standard Method)>

0.01 g of 1,2-dichlorobenzene was weighed accurately and diluted in 70 ml of acetone for mixing them well to produce an internal standard solution. At this time, the concentration of 1,2-dichlorobenzene in the internal standard solution was defined as z. 1 g of a resin to measure, 1 g of the internal standard solution and 20 g of acetone were respectively weighed accurately and mixed to dissolve the resin (resin: $x_0$ gram, internal standard solution: $y_0$ gram). After the dissolution, the solution was allowed to stand to separate the precipitate and the supernatant liquid. 3 micro-liters of the supernatant liquid was analyzed using gas chromatography under the following conditions.

Device: GL Sciences Inc.
GC-353 column: 50 m×0.25 mm
ULBON HR-1
Column temperature: 60 degrees centigrade
Injection temperature: 180 degrees centigrade
$N_2$ gas flow rate: 10 ml/min.
Sample solution: 5% acetone solution
Amount of solution injected: 3 micro-liters
Detector: FID A volatile component contained in the resin was specified from the obtained gas chromatogram. Subsequently, the volatile components were weighed. Herein, styrene was explained as an example and the same procedure was applied to other monomers or other components such as a solvent or the like to be used in the production.

Firstly, a calibration curve of the specified component was prepared.

The calibration curve was prepared in the following manner.

1. 0.2 g of 1,2-dichlorobenzene and 0.1 g of styrene are weighed accurately in a 20-mL screw tube and diluted with 10 g of acetone, and then mixed well.
2. 0.2 g of 1,2-dichlorobenzene and 0.2 g of styrene are weighed accurately in a 20-mL screw tube and diluted with 10 g of acetone, and then mixed well.
3. 0.2 g of 1,2-dichlorobenzene and 0.3 g of styrene are weighed accurately in a 20-mL screw tube and diluted with 10 g of acetone, and then mixed well.
4. One micro-litter of each sample regulated in the above steps 1 to 3 is fed to a 20-mL screw tube using a micro syringe and diluted with 10 g of acetone, and then mixed well.
5. Samples obtained in the step 4 are respectively injected into gas chromatograph under the above conditions.
6. An AREA value is obtained according to the concentrations of each sample respectively by the gas chromatograph.
7. With respect to the ratio ($x_1$) of AREA values of styrene to 1,2-dichlorobenzene, the weight ratio ($=y_1$) of styrene to 1,2-dichlorobenzene is plotted and a first-order approximate expression (Y=ax+b) is calculated using the least square method to prepare a calibration curve.

$R^2$ at this time is confirmed to be not less than 0.9800. When it is less than 0.9800, a calibration curve is prepared again.

The amount of styrene in a sample was calculated in the following manner.

1. The ratio of the AREA value of styrene to the AREA value of 1,2-dichlorobenzene in the sample obtained by gas chromatograph is defined as $x_2$.
2. By the substitution of $x_2$ for the first-order approximate expression of the calibration curve, the weight ratio ($=y_2$) of styrene to 1,2-dichlorobenzene is calculated.
3. The amount of styrene in the resin is calculated by the following equation.

$$\text{Amount of styrene(ppm)} = y_2 \times z \times y_0/(1{,}000{,}000 \times x_0)$$

The toner was also measured in the same manner.

<Dispersibility of Releasing Agent>

Using a transmission electron microscope H-7000 (a product of Hitachi Ltd.), the dispersion state of the releasing agent was confirmed at ×10000 magnification. When a measurement sample was a binder rein, the binder resin was trimmed, surface-developed, and then dyed with $RuO_4$, whereby a super slice piece was prepared and observed. The major axis diameters of the releasing agent to be observed were measured and a mean value thereof was defined as a dispersed-particle diameter. When a measurement sample was a toner, the toner was wrapped with an epoxy resin and was observed in the same manner as in the resin.

Next, evaluation methods of the toner carried out in the present invention are described below.

1. Evaluation of Fixing Properties

An unfixed image was formed using a copier produced by remodeling a commercial electrophotographic copier. Then, the unfixed image was fixed using a heat roller fixing apparatus produced by remodeling of the fixing section of a commercial copier at a fixing speed of the heat roller of 190 mm/sec respectively at a temperature of 150, 160 and 170 degrees centigrade. The fixed image obtained was rubbed 6 times by applying a load of 1.0 kgf using a sand eraser (a product of Tombow Pencil Co., Ltd.), and the image densities before and after the rubbing test were measured using a Macbeth reflection densitometer. The image density after the rubbing test÷image density before the rubbing test×100 was taken as the change ratio at its temperature. The average value of the each change ratio at 150, 160 and 170 degrees centigrade was calculated as a fixing ratio which was then determined on the basis of the following evaluation standard. Incidentally, the heat roller fixing apparatus used herein had no silicone oil feeder. Further the environmental conditions were under normal temperature and normal pressure (temperature of 22 degrees centigrade, relative humidity of 55%).

(Evaluation Standard)
A: 67%≦(not less than) Fixing ratio
B: 63%<(more than) Fixing ratio<(less than) 67%
C: Fixing ratio≦(not more than) 63%

2. Offset Resistance

The offset resistance was evaluated as follows according to the above measurement of the lowest fixing temperature. That is after an unfixed image was formed using the above copier; then the toner image was fixed using the above heat roller fixing apparatus; and the appearance of toner staining on the non-image portion was examined. This operation was repeated by gradually increasing the set temperature of the heat roller of the heat roller fixing apparatus. The lowest set temperature at which toner staining appeared was taken as the temperature of offset appearance. Further, the atmosphere of the above copier was a temperature of 22 degrees centigrade and a relative humidity of 55%.

(Evaluation Standard)

A: 180 degrees centigrade≦(not less than) Temperature of offset appearance

B: 160≦(not less than) Temperature of offset appearance<(less than) 180 degrees centigrade C: Temperature of offset appearance<(less than) 160 degrees centigrade 3. Cleaning Properties After continuous copying of 20,000 copies was conducted at a temperature of 22 degrees centigrade and a relative humidity of 55% using the above copier, contamination of a photo-sensitive material was evaluated visually.

(Evaluation Standard)

A: Not contaminated at all

C: Contamination confirmed

4. Storage Stability 5 g of the toner was allowed to stand under the environmental conditions of a temperature of 50 degrees centigrade and a relative humidity of 60% for 24 hours, and the toner was fed into a sieve of 150 mesh. Then, the scale of a rheostat of a powder tester (Hosokawa Powder Technology Research Institute) was set to 3 for vibrating it for a minute. After vibration, the mass remained on the sieve of 150 mesh was measured to obtain the residual mass ratio.

(Evaluation Standard)

A: Residual mass ratio<(less than) 25%

B: 25%≦(not less than) Residual mass ratio<(less than) 30%

C: 30%≦(not less than) Residual mass ratio

5. Durability

To a 10-ml glass sample tube was fed 24 g of a stainless steel ball, and 0.05 g of a toner was added thereto. The tube was lidded and the resulting material was stirred while rotating at a rate of 300 rpm for 20 minutes. The particle size distributions of the toner before and after stirring were measured by the use of a coulter counter. (number median diameter D50 before stirring−number median diameter D50 after stirring)÷number median diameter D50 before stirring×100 was taken as the particle diameter change ratio which was then determined according to the following standard.

(Evaluation Standard)

A: Particle diameter change ratio≦(not less than) 21%

B: 21%<(more than) Particle diameter change ratio≦(not less than) 23%

C: 23%<(more than) Particle diameter change ratio

6. Productivity

In the production of a toner, the mixture kneaded using a twin screw kneader and cooled was partially collected and arranged at 10 mesh under and 16 mesh on particle size, and then ground under predetermined conditions using a jet mill to measure the toner yield. The particle size distribution was measured using a coulter counter, and (yield g of the toner per unit hour)÷(weight g of one toner particle obtained from volume median diameter D50)÷$10^{10}$ was taken as the productivity which was then determined according to the following standard.

A: 100≦(not less than) Productivity

B: 95≦(not less than) Productivity<(less than) 100

C: Productivity<(less than) 95

7. Gloss

An unfixed image was formed using a copier produced by remodeling a commercial electrophotographic copier. Then, the unfixed image was fixed using a heat belt fixing apparatus produced by remodeling the fixing section of the commercial copier at a fixing speed of 125 mm/sec of the heat roller at a temperature of 150 degrees centigrade. The image density of the fixed image obtained at this time was measured using a Macbeth reflection densitometer and adjusted so as to be 1.4. The glossiness of the resulting fixed image was measured at an incident angle of 75° by means of a Variable Gloss Meter GM-3D (a product of Murakami Color Research Laboratory Co., Ltd.). Further, the atmosphere of the above copier was a temperature of 22 degrees centigrade and a relative humidity of 55%.

(Evaluation Standard)

A: 30%≦(not less than) Glossiness

B: 25%≦(not less than) Glossiness<(less than) 30%

C: Glossiness<(less than) 25%

Production Examples of Glycidyl Group-Containing Vinyl Resin (E)

Production Example E-1

50 mass % of xylene based on 100 mass % of monomers was fed into a flask purged with nitrogen and the resulting material was heated. Under xylene reflux, 0.5 mass % of di-t-butylperoxide was continuously added in the total amount of 100 mass % of monomers previously mixed and dissolved as illustrated in Table 1 over 5 hours, and further continuously refluxed for 1 hour. Thereafter, while an internal temperature was maintained at 130 degrees centigrade, 0.5 mass % of di-t-butylperoxide was added and the reaction was continued for 2 hours to obtain a polymerization solution. The resulting polymerization solution was flashed in a vessel at 160 degrees centigrade and 1.33 kPa for removing a solvent or the like to obtain a resin E-1. The physical properties thereof are shown in Table 1.

Production Example E-2

50 mass % of xylene based on 100 mass % of monomers was fed into a flask purged with nitrogen and the resulting material was heated. Under xylene reflux, 0.4 mass % of di-t-butylperoxide was continuously added in the total amount of 100 mass % of monomers previously mixed and dissolved as illustrated in Table 1 over 5 hours, and further continuously refluxed for 1 hour. Thereafter, while an internal temperature was maintained at 130 degrees centigrade, 0.5 mass % of di-t-butylperoxide was added and the reaction was continued for 2 hours to obtain a polymerization solution. The resulting polymerization solution was flashed in a vessel at 160 degrees centigrade and 1.33 kPa for removing a solvent or the like to obtain a resin E-2. The physical properties thereof are shown in Table 1.

Production Example E-3

A resin E-3 was obtained in the same manner as in Production Example E-1, except for monomer composition as described in Table 1. The physical properties thereof are shown in Table 1.

Production Example E-4

A resin E-4 was obtained in the same manner as in Production Example E-1, except for monomer composition as described in Table 1. The physical properties thereof are shown in Table 1.

Production Example E-5

A resin E-5 was obtained in the same manner as in Production Example E-1, except for monomer composition as described in Table 1. The physical properties thereof are shown in Table 1.

Production Examples of Low Molecular Weight Vinyl Resin (L)

Production Example L-1

50 mass % of xylene based on 100 mass % of monomers was fed into a flask purged with nitrogen and the resulting material was heated. Under xylene reflux, 1.8 mass % of t-butylperoxy-2-ethylhexanoate was continuously added in the total amount of 100 mass % of monomers previously mixed and dissolved as illustrated in Table 2 over 5 hours, and further continuously refluxed for 1 hour. Thereafter, while an internal temperature was maintained at 98 degrees centigrade, 0.5 mass % of t-butylperoxy-2-ethylhexanoate was added and the reaction was continued for 1 hour, and 0.5 mass % of t-butylperoxy-2-ethylhexanoate was further added and the reaction was continued for 2 hours to obtain a polymerization solution L-1. The physical properties thereof are shown in Table 2.

Production Example L-2

A polymerization solution L-2 was obtained in the same manner as in Production Example L-1, except for monomer composition as described in Table 2. The physical properties thereof are shown in Table 2.

Production Example L-3

50 mass % of xylene based on 100 mass % of monomers was fed into a flask purged with nitrogen and the resulting material was heated. Under xylene reflux, 1.0 mass % of t-butylperoxy-2-ethylhexanoate was continuously added in the total amount of 100 mass % of monomers previously mixed and dissolved as illustrated in Table 2 over 7 hours, and further continuously refluxed for 1 hour. Thereafter, while an internal temperature was maintained at 98 degrees centigrade, 0.5 mass % of t-butylperoxy-2-ethylhexanoate was further added and the reaction was continued for 1 hour, and 0.5 mass % of t-butylperoxy-2-ethylhexanoate was further added and the reaction was continued for 2 hours to obtain a polymerization solution L-3. The physical properties thereof are shown in Table 2.

Production Example L-4

6.72 mass % of WAX-1 as described in Table 3 and 50 mass % of xylene were fed into a flask purged with nitrogen and the resulting material was heated. Under xylene reflux, 1.8 mass % of t-butylperoxy-2-ethylhexanoate was continuously added in the total amount of 100 mass % of monomers previously mixed and dissolved as illustrated in Table 2 over 5 hours, and further continuously refluxed for 1 hour. Thereafter, while an internal temperature was maintained at 98 degrees centigrade, 0.5 mass % of t-butylperoxy-2-ethylhexanoate was further added and the reaction was continued for 1 hour, and 0.5 mass % of t-butylperoxy-2-ethylhexanoate was further added and the reaction was continued for 2 hours to obtain a polymerization solution L-4. The physical properties thereof are shown in Table 2.

Production Examples L-5 to L-7

Polymerization solutions L-5 to L-7 were obtained in the same manner as in Production Example L-4 with feeding compositions as indicated in Tables 2 and 3. The physical properties thereof are shown in Table 2.

Production Example L-8

50 mass % of xylene based on 100 mass % of monomers was fed into a flask purged with nitrogen and the resulting material was heated. Under xylene reflux, 0.5 mass % of di-t-butylperoxide was continuously added in the total amount of 100 mass % of monomers previously mixed and dissolved as illustrated in Table 2 over 5 hours, and further continuously refluxed for 1 hour. Thereafter, while an internal temperature was maintained at 130 degrees centigrade, 0.5 mass % of di-t-butylperoxide was added and the reaction was continued for 2 hours to obtain a polymerization solution L-8. The physical properties thereof are shown in Table 2.

Production Example L-9

100 mass % of xylene based on 100 mass % of monomers was fed into a flask purged with nitrogen and the resulting material was heated. Under xylene reflux, 2.5 mass % of t-butylperoxy-2-ethylhexanoate was continuously added in the total amount of 100 mass % of monomers previously mixed and dissolved as illustrated in Table 2 over 5 hours, and further continuously refluxed for 1 hour. Thereafter, while an internal temperature was maintained at 98 degrees centigrade, 0.5 mass % of t-butylperoxy-2-ethylhexanoate was added and the reaction was continued for 1 hour, and 0.5 mass % of t-butylperoxy-2-ethylhexanoate was further added and the reaction was continued for 2 hours to obtain a polymerization solution L-9. The physical properties thereof are shown in Table 2.

Production Example L-10

75 mass % of xylene based on 100 mass % of monomers was fed into a flask purged with nitrogen and the resulting material was heated. Under xylene reflux, 2.0 mass % of t-butylperoxy-2-ethylhexanoate was continuously added in the total amount of 100 mass % of monomers previously mixed and dissolved as illustrated in Table 2 over 5 hours, and further continuously refluxed for 1 hour. Thereafter, while an internal temperature was maintained at 98 degrees centigrade, 0.5 mass % of t-butylperoxy-2-ethylhexanoate was added and the reaction was continued for 1 hour, and 0.5 mass % of t-butylperoxy-2-ethylhexanoate was further added and the reaction was continued for 2 hours to obtain a polymerization solution L-10. The physical properties thereof are shown in Table 2.

Production Example L-11

200 mass % of xylene based on 100 mass % of monomers was fed into a flask purged with nitrogen and the resulting material was heated. Under xylene reflux, 1.0 mass % of di-t-butylperoxide was continuously added in the total amount of 100 mass % of monomers previously mixed and dissolved as illustrated in Table 2 over 4 hours, and further continuously refluxed for 1 hour. Thereafter, while an internal temperature was maintained at 130 degrees centigrade, 0.5 mass % of di-t-butylperoxide was added and the reaction was continued for 2 hours to obtain a polymerization solution L-11. The physical properties thereof are shown in Table 2.

Production Examples of High Molecular Weight Vinyl Resin (H)

Production Example H-1

100 mass % of monomers as illustrated in Table 4 was fed into a flask purged with nitrogen. An internal temperature was elevated to 120 degrees centigrade and kept at the same temperature, and bulk polymerization was carried out for 8 hours. Subsequently, 50 mass % of xylene was added to 100 mass % of monomers, 0.2 mass % of tetraethylene glycol diacrylate was added, and the temperature was elevated to 110 degrees centigrade. 0.35 mass % of 1,1-bis(t-butylperoxy)cyclohexane and 60 mass % of xylene previously mixed and dissolved were continuously added thereto over 9 hours while maintaining the temperature at 110 degrees centigrade, and then the reaction was continued for 1 hour. 0.21 mass % of 1,1-bis(t-butylperoxy)cyclohexane was added and the reaction was continued for 2 hours. 0.52 mass % of 1,1-bis(t-butylperoxy)cyclohexane was further added and the reaction was continued for 2 hours, whereby the reaction was completed to obtain a high molecular weight polymerization solution H-1. The physical properties are shown in Table 4.

Production Example H-2

100 mass % of monomers as illustrated in Table 4 was fed into a flask purged with nitrogen. An internal temperature was elevated to 128 degrees centigrade and kept at the same temperature, and bulk polymerization was carried out for 3 hours. Subsequently, 50 mass % of xylene was added to 100 mass % of monomers. Thereafter, the temperature was elevated to 110 degrees centigrade. 0.35 mass % of 1,1-bis(t-butylperoxy)cyclohexane and 60 mass % of xylene previously mixed and dissolved were continuously added thereto over 9 hours while maintaining the temperature at 110 degrees centigrade, and then the reaction was continued for 1 hour. 0.21 mass % of 1,1-bis(t-butylperoxy)cyclohexane was added and the reaction was continued for 2 hours. 0.52 mass % of 1,1-bis(t-butylperoxy)cyclohexane was further added and the reaction was continued for 2 hours, whereby the reaction was completed to obtain a high molecular weight polymerization solution H-2. The physical properties are shown in Table 4.

Production Example H-3

A high molecular weight polymerization solution H-3 was obtained in the same manner as in Production Example H-1 with feeding composition as indicated in Table 4. The physical properties thereof are shown in Table 4.

Production Example H-4

A high molecular weight polymerization solution H-4 was obtained in the same manner as in Production Example H-2 with feeding composition as indicated in Table 4. The physical properties thereof are shown in Table 4.

TABLE 1

(Glycidyl group-containing resin/Crosslinking agent E)

| Name of Resin | Monomer Composition | | | | | Monomer/Solvent Ratio | | Physical Properties | |
|---|---|---|---|---|---|---|---|---|---|
| | St wt % | BA wt % | Mac wt % | GMA wt % | Total wt % | Monomer wt % | Xy wt % | Peak Mw | Epoxy value Eq/100 g |
| E-1 | 78.00 | 20.50 | 0.00 | 1.50 | 100 | 100 | 50 | 51,000 | 0.011 |
| E-2 | 78.50 | 21.00 | 0.00 | 0.50 | 100 | 100 | 50 | 59,000 | 0.004 |
| E-3 | 78.00 | 20.00 | 0.00 | 2.00 | 100 | 100 | 50 | 45,000 | 0.014 |
| E-4 | 76.50 | 20.00 | 0.00 | 3.50 | 100 | 100 | 50 | 50,000 | 0.025 |
| E-5 | 79.00 | 21.00 | 0.00 | 0.00 | 100 | 100 | 50 | 50,000 | 0.000 |

TABLE 2

(Low molecular weight vinyl resin (L))

| Name of Resin | Monomer Composition | | | | | Wax | | Monomer/Solvent Ratio | | Physical Properties | |
|---|---|---|---|---|---|---|---|---|---|---|---|
| | St mass % | BA mass % | Mac mass % | GMA mass % | Total mass % | Type | mass % | Monomer mass % | Xy Mass % | Peak Mw | AV KOHmg/g |
| L-1 | 74.00 | 22.00 | 4.00 | 0.00 | 100 | | | 100 | 50 | 24200 | 26 |
| L-2 | 77.50 | 21.50 | 1.00 | 0.00 | 100 | | | 100 | 50 | 21000 | 6.5 |
| L-3 | 74.00 | 22.00 | 4.00 | 0.00 | 100 | | | 100 | 50 | 35100 | 26 |
| L-4 | 79.00 | 20.00 | 1.00 | 0.00 | 100 | WAX-1 | 6.72 | 100 | 50 | 21000 | 6.5 |
| L-5 | 79.00 | 20.00 | 1.00 | 0.00 | 100 | WAX-2 | 6.72 | 100 | 50 | 21000 | 6.5 |
| L-6 | 79.00 | 20.00 | 1.00 | 0.00 | 100 | WAX-3 | 6.72 | 100 | 50 | 21000 | 6.5 |
| L-7 | 79.00 | 20.00 | 1.00 | 0.00 | 100 | WAX-4 | 6.72 | 100 | 50 | 21000 | 6.5 |
| L-8 | 77.00 | 22.00 | 1.00 | 0.00 | 100 | | | 100 | 50 | 49000 | 6.5 |

TABLE 2-continued (Low molecular weight vinyl resin (L))

| Name of Resin | Monomer Composition | | | | | Wax | | Monomer/Solvent Ratio | | Physical Properties | |
|---|---|---|---|---|---|---|---|---|---|---|---|
| | St mass % | BA mass % | Mac mass % | GMA mass % | Total mass % | Type | mass % | Monomer mass % | Xy Mass % | Peak Mw | AV KOHmg/g |
| L-9 | 78.50 | 20.50 | 1.00 | 0.00 | 100 | | | 100 | 100 | 13500 | 6.5 |
| L-10 | 76.00 | 21.00 | 3.00 | 0.00 | 100 | | | 100 | 75 | 18500 | 19.5 |
| L-11 | 77.50 | 21.50 | 1.00 | 0.00 | 100 | | | 100 | 200 | 19500 | 6.5 |

TABLE 3

(Releasing agent/Wax)

| Name of Wax | Type | Product Name | | Melting Point (° C.) |
|---|---|---|---|---|
| WAX-1 | Paraffin wax | HNP-10 | Nippon Seiro Co., Ltd. | 75 |
| WAX-2 | Fischer-Tropsch wax | FT100 | Nippon Seiro Co., Ltd. | 98 |
| WAX-3 | Carnauba wax | Carnauba No. 1 | Nippon Wax Co., Ltd. | 84 |
| WAX-4 | Polyethylene wax | Polywax 1000 | Baker Petrolite Corp. | 113 |
| WAX-5 | Paraffin wax | HNP-0190 | Nippon Seiro Co., Ltd. | 85 |
| WAX-6 | Ester wax | WEP-5 | Nippon Oils and Fats Co., Ltd. | 86 |
| WAX-7 | Polypropylene wax | NP105 | Mitsui Chemicals Inc. | 140 |

TABLE 4

(High molecular weight vinyl resin (H))

| Name of Resin | Monomer Composition | | | | | Physical Properties | |
|---|---|---|---|---|---|---|---|
| | St mass % | BA mass % | Mac mass % | GMA mass % | Total mass % | Peak Mw | AV KOHmg/g |
| H-1 | 74.00 | 23.50 | 2.50 | 0.00 | 100 | 300000 | 16.25 |
| H-2 | 74.00 | 23.50 | 2.50 | 0.00 | 100 | 170000 | 16.25 |
| H-3 | 73.00 | 24.00 | 3.00 | 0.00 | 100 | 320000 | 19.5 |
| H-4 | 74.80 | 23.60 | 1.60 | 0.00 | 100 | 160000 | 10.4 |

Production Examples Of Carboxyl Group-Containing Vinyl Resin (C) and Mixture of Carboxyl Group-Containing Vinyl Resin (C) with Releasing Agent Production Example C-1

Respective polymerization solutions were mixed such that the mass ratio of a high molecular weight vinyl resin (H) to a low molecular weight vinyl resin (L) was the ratio as described in Tables 5-1 and 5-2. Furthermore, 3.23 mass % of WAX-1 and 5.38 mass % of WAX-2 as releasing agents, 0.5 mass % of styrene-ethylene-butylene-styrene block copolymer (SEBS) (produce name: Kraton G1652; a product of Kraton Polymers Japan LTD) as an additive were mixed in 100 mass % of the total amount of the high molecular weight vinyl resin (H) and the low molecular weight vinyl resin (L). Thereafter, under xylene reflux, the resulting mixture was mixed for 30 minutes and flashed in a vessel at 190 degrees centigrade and 1.33 kPa for removing a solvent or the like to obtain resin C-1. The physical properties thereof are shown in Tables 5-1 and 5-2.

Production Examples C-2 to C-29)

A high molecular weight vinyl resin (H), a low molecular weight vinyl resin (L), a releasing agent and an additive were mixed such that the mass ratio thereof was the ratio as described in Tables 5-1 and 5-2 to obtain resins C-2 to C-25 in the same manner as in Production Example C-1. The physical properties thereof are shown in Tables 5-1 and 5-2.

TABLE 5-1

(Mixture of carboxyl group-containing resin C and releasing agent)

| Name of Resin | High Molecular H Type | mass % | Low Molecular L Type | mass % | Releasing Agent 1 Type | mass % | Releasing Agent 2 Type | mass % | Additive Type | mass % |
|---|---|---|---|---|---|---|---|---|---|---|
| C-1 | H-1 | 15 | L-1 | 85 | WAX-1 | 3.23 | WAX-2 | 5.38 | SEBS | 0.5 |
| C-2 | H-1 | 20 | L-2 | 80 | WAX-1 | 3.23 | WAX-2 | 5.38 | SEBS | 0.5 |
| C-3 | H-1 | 20 | L-2 | 80 | WAX-1 | 2.15 | WAX-2 | 2.15 | SEBS | 0.2 |
| C-4 | H-1 | 20 | L-2 | 80 | WAX-3 | 6.45 | | | SEBS | 0.4 |
| C-5 | H-1 | 20 | L-2 | 80 | WAX-4 | 6.45 | | | SEBS | 0.4 |
| C-6 | H-1 | 20 | L-2 | 80 | WAX-5 | 6.45 | | | SEBS | 0.4 |
| C-7 | H-1 | 20 | L-2 | 80 | WAX-6 | 6.45 | | | SEBS | 0.4 |
| C-8 | H-1 | 15 | L-3 | 85 | WAX-1 | 3.23 | WAX-2 | 5.38 | SEBS | 0.50 |
| C-9 | H-1 | 30 | L-2 | 70 | WAX-1 | 3.23 | WAX-2 | 5.38 | SEBS | 0.50 |
| C-10 | H-1 | 10 | L-2 | 90 | WAX-1 | 3.23 | WAX-2 | 5.38 | SEBS | 0.50 |
| C-11 | H-1 | 19 | L-4 | 81 | | | | | | |
| C-12 | H-1 | 19 | L-4 | 81 | WAX-1 | 5.10 | | | | |
| C-13 | H-1 | 19 | L-5 | 81 | | | | | | |
| C-14 | H-1 | 19 | L-6 | 81 | | | | | | |
| C-15 | H-1 | 19 | L-7 | 81 | | | | | | |
| C-16 | H-2 | 20 | L-2 | 80 | WAX-1 | 3.23 | WAX-2 | 5.38 | SEBS | 0.50 |
| C-17 | H-3 | 20 | L-2 | 80 | WAX-1 | 3.23 | WAX-2 | 5.38 | SEBS | 0.50 |
| C-18 | H-4 | 20 | L-2 | 80 | WAX-1 | 3.23 | WAX-2 | 5.38 | SEBS | 0.50 |
| C-19 | H-1 | 20 | L-2 | 80 | WAX-1 | 3.37 | WAX-2 | 5.62 | SEBS | 0.50 |
| C-20 | H-1 | 20 | L-2 | 80 | WAX-1 | 3.11 | WAX-2 | 5.18 | SEBS | 0.50 |
| C-21 | H-1 | 20 | L-8 | 80 | WAX-1 | 3.23 | WAX-2 | 5.38 | SEBS | 0.50 |
| C-22 | H-1 | 20 | L-9 | 80 | WAX-1 | 3.23 | WAX-2 | 5.38 | SEBS | 0.50 |
| C-23 | H-1 | 20 | L-10 | 80 | WAX-1 | 3.23 | WAX-2 | 5.38 | SEBS | 0.50 |
| C-24 | H-1 | 20 | L-11 | 80 | WAX-1 | 3.23 | WAX-2 | 5.38 | SEBS | 0.50 |
| C-25 | H-1 | 20 | L-2 | 80 | WAX-2 | 16.13 | | | SEBS | 0.50 |
| C-26 | H-1 | 20 | L-2 | 80 | | | | | | |
| C-27 | H-1 | 40 | L-2 | 60 | WAX-1 | 3.23 | WAX-2 | 5.38 | SEBS | 0.50 |
| C-28 | — | — | L-2 | 100 | WAX-1 | 3.23 | WAX-2 | 5.38 | SEBS | 0.50 |
| C-29 | H-1 | 20 | L-2 | 80 | WAX-7 | 5.38 | | | SEBS | 0.50 |

TABLE 5-2

(Mixture of carboxyl group-containing resin C and releasing agent)

| Name of Resin | Ratio of H in Resin C (excluding WAX Component) mass % | Ratio of L in Resin C (excluding WAX Component) mass % | Releasing Agent added during Polymerization Type | mass % | Releasing Agent 1 added during Removal of Solvent Type | mass % | Releasing Agent 2 added during Removal of Solvent Type | mass % | Acid Value KOHmg/g |
|---|---|---|---|---|---|---|---|---|---|
| C-1 | 15 | 85 | | | WAX-1 | 3.23 | WAX-2 | 5.38 | 24.5 |
| C-2 | 20 | 80 | | | WAX-1 | 3.23 | WAX-2 | 5.38 | 8.5 |
| C-3 | 20 | 80 | | | WAX-1 | 2.15 | WAX-2 | 2.15 | 8.5 |
| C-4 | 20 | 80 | | | WAX-3 | 6.45 | | | 8.5 |
| C-5 | 20 | 80 | | | WAX-4 | 6.45 | | | 8.5 |
| C-6 | 20 | 80 | | | WAX-5 | 6.45 | | | 8.5 |
| C-7 | 20 | 80 | | | WAX-6 | 6.45 | | | 8.5 |
| C-8 | 15 | 85 | | | WAX-1 | 3.23 | WAX-2 | 5.38 | 24.5 |
| C-9 | 30 | 70 | | | WAX-1 | 3.23 | WAX-2 | 5.38 | 9.4 |
| C-10 | 10 | 90 | | | WAX-1 | 3.23 | WAX-2 | 5.38 | 7.5 |
| C-11 | 20 | 80 | WAX-1 | 5.37 | | | | | 8.5 |
| C-12 | 20 | 80 | WAX-1 | 5.37 | WAX-1 | 5.37 | | | 8.5 |
| C-13 | 20 | 80 | WAX-2 | 5.37 | | | | | 8.5 |

TABLE 5-2-continued (Mixture of carboxyl group-containing resin C and releasing agent)

| Name of Resin | Ratio of H in Resin C (excluding WAX Component) mass % | Ratio of L in Resin C (excluding WAX Component) mass % | Releasing Agent Component (to Carboxyl Group-containing Resin C 100 mass %) | | | | | | Acid Value KOHmg/g |
|---|---|---|---|---|---|---|---|---|---|
| | | | Releasing Agent added during Polymerization | | Releasing Agent 1 added during Removal of Solvent | | Releasing Agent 2 added during Removal of Solvent | | |
| | | | Type | mass % | Type | mass % | Type | mass % | |
| C-14 | 20 | 80 | WAX-3 | 5.37 | | | | | 8.5 |
| C-15 | 20 | 80 | WAX-4 | 5.37 | | | | | 8.5 |
| C-16 | 20 | 80 | | | WAX-1 | 3.23 | WAX-2 | 5.38 | 8.5 |
| C-17 | 20 | 80 | | | WAX-1 | 3.23 | WAX-2 | 5.38 | 9.1 |
| C-18 | 20 | 80 | | | WAX-1 | 3.23 | WAX-2 | 5.38 | 7.3 |
| C-19 | 20 | 80 | | | WAX-1 | 3.37 | WAX-2 | 5.62 | 8.5 |
| C-20 | 20 | 80 | | | WAX-1 | 3.11 | WAX-2 | 5.18 | 8.5 |
| C-21 | 20 | 80 | | | WAX-1 | 3.23 | WAX-2 | 5.38 | 8.5 |
| C-22 | 20 | 80 | | | WAX-1 | 3.23 | WAX-2 | 5.38 | 8.5 |
| C-23 | 20 | 80 | | | WAX-1 | 3.23 | WAX-2 | 5.38 | 18.9 |
| C-24 | 20 | 80 | | | WAX-1 | 3.23 | WAX-2 | 5.38 | 8.5 |
| C-25 | 20 | 80 | | | WAX-2 | 16.13 | | | 8.5 |
| C-26 | 20 | 80 | | | | | | | 8.5 |
| C-27 | 40 | 60 | | | WAX-1 | 3.23 | WAX-2 | 5.38 | 10.4 |
| C-28 | 0 | 100 | | | WAX-1 | 3.23 | WAX-2 | 5.38 | 6.5 |
| C-29 | 20 | 80 | | | WAX-7 | 5.38 | | | 8.5 |

Production Examples of Binder Resin (R)

Production Examples R-1 to R-27 and R-29 to R-34

Respective resins were mixed such that the mass ratio of a mixture of the carboxyl group-containing vinyl resin (C) and a releasing agent to the glycidyl group-containing vinyl resin (E) was the ratio as described in Table 6. Thereafter, the mixture was kneaded and reacted at 25 kg/hr and 1,400 rpm by the use of a twin screw kneader (KEXN S-40 type, a product of Kurimoto Ltd.) with its temperature set to the reaction temperature as described in Table 7. In the middle of the reaction, water was injected thereinto at 2 MPa and 380 g/hr. The pressure was reduced down to 0.095 MPa based on an absolute pressure by a pressure reducing pump equipped with a pressure reducing port installed at an outlet side from a water inlet to remove the volatile component. Thereafter, the resulting material was cooled and ground to obtain binder resins R-1 to R-27 and R-29 to R-34. The physical properties are shown in Table 7. As a method for cooling, a steel belt cooler was used. The device was used under conditions of the cooling water temperature of 10 degrees centigrade, the amount of cooling water of 20 liter per 1 kg of the resin, a thermal conductivity of 0.08 kcal/mhrs for rapid cooling. The physical properties are shown in Table 7.

Production Example R-28

Respective resins were mixed such that the mass ratio of the carboxyl group-containing vinyl resin C-26 to the glycidyl group-containing vinyl resin (E) was the ratio as described in Table 6. Thereafter, the mixture was kneaded and reacted at 25 kg/hr and 1,400 rpm by the use of a twin screw kneader (KEXN S-40 type, a product of Kurimoto Ltd.) with its temperature set to the reaction temperature as described in Table 7. In the middle of the reaction, water was injected thereinto at 2 MPa and 380 g/hr. The pressure was reduced down to 0.095 MPa based on an absolute pressure by a pressure reducing pump equipped with a pressure reducing port installed at an outlet side from a water inlet to remove the volatile component. Thereafter, the resulting material was cooled and ground to obtain a binder resin R-28. As a method for cooling, a steel belt cooler was used. The device was used under conditions of the cooling water temperature of 10 degrees centigrade, the amount of cooling water of 20 liter per 1 kg of the resin, a thermal conductivity of 0.08 kcal/mhrs for rapid cooling. The physical properties are shown in Table 7.

Production Example R-35

A resin R-35 was obtained in the same manner as in Production Example R-12, except that water was not added during kneading and reaction. The physical properties are shown in Table 7.

TABLE 6

(Binder resin)

Composition of Binder Resin

| Name of Resin | Feeding Raw Materials Mixture of Carboxyl Group-Containing Resin C and Releasing Agent | | Glycidyl Group-Containing Resin E | | Carboxyl Group-Containing Resin C + Glycidyl Group-Containing Resin E | Releasing Agent added during Polymerization | | Releasing Agent 1 added during Removal of Solvent | | Releasing Agent 2 added during Removal of Solvent | |
|---|---|---|---|---|---|---|---|---|---|---|---|
| | Type | mass % | Type | mass % | mass % | Type | mass % | Type | mass % | Type | mass % |
| R-1 | C-1 | 93.5 | E-1 | 6.5 | 100.0 | | | WAX-1 | 3.00 | WAX-2 | 5.00 |
| R-2 | C-2 | 93.5 | E-1 | 6.5 | 100.0 | | | WAX-1 | 3.00 | WAX-2 | 5.00 |
| R-3 | C-4 | 93.3 | E-1 | 6.7 | 100.0 | | | WAX-1 | 2.00 | WAX-2 | 2.00 |
| R-4 | C-5 | 93.4 | E-1 | 6.6 | 100.0 | | | WAX-3 | 6.00 | | |
| R-5 | C-6 | 93.4 | E-1 | 6.6 | 100.0 | | | WAX-4 | 6.00 | | |
| R-6 | C-7 | 93.4 | E-1 | 6.6 | 100.0 | | | WAX-5 | 6.00 | | |
| R-7 | C-8 | 93.4 | E-1 | 6.6 | 100.0 | | | WAX-6 | 6.00 | | |
| R-8 | C-8 | 93.5 | E-1 | 6.5 | 100.0 | | | WAX-1 | 3.00 | WAX-2 | 5.00 |
| R-9 | C-9 | 93.5 | E-1 | 6.5 | 100.0 | | | WAX-1 | 3.00 | WAX-2 | 5.00 |
| R-10 | C-10 | 93.5 | E-1 | 6.5 | 100.0 | | | WAX-1 | 3.00 | WAX-2 | 5.00 |
| R-11 | C-11 | 93.3 | E-1 | 6.7 | 100.0 | WAX-1 | 5.00 | | | | |
| R-12 | C-12 | 93.6 | E-1 | 6.4 | 100.0 | WAX-1 | 5.00 | WAX-1 | 5.00 | | |
| R-13 | C-13 | 93.3 | E-1 | 6.7 | 100.0 | WAX-2 | 5.00 | | | | |
| R-14 | C-14 | 93.3 | E-1 | 6.7 | 100.0 | WAX-3 | 5.00 | | | | |
| R-15 | C-15 | 93.3 | E-1 | 6.7 | 100.0 | WAX-4 | 5.00 | | | | |
| R-16 | C-16 | 93.5 | E-1 | 6.5 | 100.0 | | | WAX-1 | 3.00 | WAX-2 | 5.00 |
| R-17 | C-17 | 93.5 | E-1 | 6.5 | 100.0 | | | WAX-1 | 3.00 | WAX-2 | 5.00 |
| R-18 | C-18 | 93.5 | E-1 | 6.5 | 100.0 | | | WAX-1 | 3.00 | WAX-2 | 5.00 |
| R-19 | C-19 | 89.8 | E-2 | 10.2 | 100.0 | | | WAX-1 | 3.00 | WAX-2 | 5.00 |
| R-20 | C-20 | 96.8 | E-3 | 3.2 | 100.0 | | | WAX-1 | 3.00 | WAX-2 | 5.00 |
| R-21 | C-1 | 93.5 | E-1 | 6.5 | 100.0 | | | WAX-1 | 3.00 | WAX-2 | 5.00 |
| R-22 | C-1 | 93.5 | E-1 | 6.5 | 100.0 | | | WAX-1 | 3.00 | WAX-2 | 5.00 |
| R-23 | C-21 | 93.5 | E-1 | 6.5 | 100.0 | | | WAX-1 | 3.00 | WAX-2 | 5.00 |
| R-24 | C-22 | 93.5 | E-1 | 6.5 | 100.0 | | | WAX-1 | 3.00 | WAX-2 | 5.00 |
| R-25 | C-23 | 93.5 | E-1 | 6.5 | 100.0 | | | WAX-1 | 3.00 | WAX-2 | 5.00 |
| R-26 | C-24 | 93.5 | E-1 | 6.5 | 100.0 | | | WAX-1 | 3.00 | WAX-2 | 5.00 |
| R-27 | C-25 | 93.9 | E-1 | 6.1 | 100.0 | | | WAX-2 | 15.00 | | |
| R-28 | C-26 | 93.0 | E-1 | 7.0 | 100.0 | | | | | | |
| R-29 | C-27 | 93.5 | E-1 | 6.5 | 100.0 | | | WAX-1 | 3.00 | WAX-2 | 5.00 |
| R-30 | C-28 | 93.5 | E-1 | 6.5 | 100.0 | | | WAX-1 | 3.00 | WAX-2 | 5.00 |
| R-31 | C-1 | 93.5 | E-4 | 6.5 | 100.0 | | | WAX-1 | 3.00 | WAX-2 | 5.00 |
| R-32 | C-1 | 93.5 | E-5 | 6.5 | 100.0 | | | WAX-1 | 3.00 | WAX-2 | 5.00 |
| R-33 | C-29 | 93.3 | E-1 | 6.7 | 100.0 | | | WAX-7 | 5.00 | | |
| R-34 | C-13 | 93.3 | E-1 | 6.7 | 100.0 | WAX-2 | 5.00 | | | | |
| R-35 | C-12 | 93.6 | E-1 | 6.4 | 100.0 | WAX-1 | 5.00 | WAX-1 | 5.00 | | |

TABLE 7

Physical Properties of Resin

| Name of Resin | Reaction Temperature °C. | Peak Molecular Weight | Mw | Mw/Mn | THF Soluble Portion having a molecular weight of not more than 2000 mass % | Tg °C. | Tm °C. | G' 160° C. Pa | Residual Volatile Content ppm | WAX Dispersion |
|---|---|---|---|---|---|---|---|---|---|---|
| R-1 | 170 | 24500 | 93000 | 13 | 5.6 | 56 | 122 | 280 | 180 | 0.5 μm |
| R-2 | 170 | 21800 | 79000 | 10 | 5.3 | 52 | 114 | 70 | 180 | 0.5 μm |
| R-3 | 170 | 21600 | 81000 | 11 | 5.2 | 55 | 116 | 100 | 180 | 0.5 μm |
| R-4 | 170 | 21600 | 99000 | 16 | 6.2 | 52 | 112 | 120 | 180 | 0.5 μm |
| R-5 | 170 | 21500 | 83000 | 10 | 4.5 | 55 | 116 | 130 | 180 | 0.5 μm |
| R-6 | 170 | 21300 | 89000 | 11 | 5.2 | 53 | 116 | 110 | 180 | 0.5 μm |
| R-7 | 170 | 21200 | 88000 | 10 | 5.1 | 53 | 115 | 100 | 180 | 0.5 μm |
| R-8 | 170 | 36200 | 101000 | 13 | 5.5 | 57 | 124 | 520 | 180 | 0.5 μm |
| R-9 | 170 | 21000 | 163000 | 23 | 4.8 | 52 | 124 | 410 | 180 | 0.5 μm |
| R-10 | 170 | 22000 | 46000 | 7 | 5.6 | 52 | 110 | 20 | 180 | 0.5 μm |

TABLE 7-continued

Physical Properties of Resin

| Name of Resin | Reaction Temperature °C. | Peak Molecular Weight | Mw | Mw/Mn | THF Soluble Portion having a molecular weight of not more than 2000 mass % | Tg °C. | Tm °C. | G' 160° C. Pa | Residual Volatile Content ppm | WAX Dispersion |
|---|---|---|---|---|---|---|---|---|---|---|
| R-11 | 170 | 21200 | 90000 | 12 | 5.8 | 50 | 110 | 50 | 180 | 0.5 μm |
| R-12 | 170 | 21100 | 94000 | 17 | 6.5 | 49 | 111 | 60 | 180 | 0.5 μm |
| R-13 | 170 | 21600 | 84000 | 10 | 4.6 | 55 | 116 | 110 | 180 | 0.5 μm |
| R-14 | 170 | 22000 | 98000 | 16 | 6.4 | 51 | 110 | 100 | 180 | 0.5 μm |
| R-15 | 170 | 21600 | 84000 | 10 | 5.4 | 56 | 118 | 190 | 180 | 0.5 μm |
| R-16 | 170 | 25100 | 66000 | 9 | 4.4 | 52 | 111 | 70 | 180 | 0.5 μm |
| R-17 | 170 | 21700 | 83000 | 11 | 5.3 | 52 | 115 | 80 | 180 | 0.5 μm |
| R-18 | 170 | 24500 | 71000 | 10 | 5 | 52 | 110 | 50 | 180 | 0.5 μm |
| R-19 | 170 | 22000 | 86000 | 13 | 5.5 | 52 | 113 | 60 | 180 | 0.5 μm |
| R-20 | 170 | 21800 | 90000 | 12 | 5.2 | 52 | 114 | 120 | 180 | 0.5 μm |
| R-21 | 200 | 24200 | 125000 | 17 | 5.5 | 57 | 127 | 540 | 160 | 0.5 μm |
| R-22 | 150 | 24200 | 93000 | 12 | 5.3 | 56 | 121 | 180 | 190 | 0.5 μm |
| R-23 | 170 | 50300 | 111000 | 15 | 4.9 | 54 | 131 | 810 | 180 | 0.5 μm |
| R-24 | 170 | 14000 | 95000 | 26 | 9.7 | 52 | 113 | 50 | 180 | 0.5 μm |
| R-25 | 170 | 18600 | 86000 | 18 | 7.3 | 56 | 120 | 230 | 180 | 0.5 μm |
| R-26 | 170 | 19600 | 80000 | 14 | 8.6 | 52 | 113 | 60 | 180 | 0.5 μm |
| R-27 | 170 | 22200 | 84000 | 12 | 5.1 | 54 | 117 | 110 | 180 | 2 μm |
| R-28 | 170 | 22900 | 78000 | 14 | 5.8 | 58 | 122 | 190 | 180 | N/A |
| R-29 | 170 | 21000 | 183000 | 26 | 5.1 | 54 | 139 | 5760 | 180 | 0.5 μm |
| R-30 | 170 | 21800 | 29000 | 4 | 6.2 | 51 | 104 | 10 | 180 | 0.5 μm |
| R-31 | 200 | 24300 | 131000 | 12 | 6.1 | 52 | 131 | 1020 | 160 | 0.5 μm |
| R-32 | 170 | 24100 | 96000 | 13 | 6.5 | 52 | 120 | 110 | 180 | 0.5 μm |
| R-33 | 170 | 22300 | 78000 | 14 | 5.8 | 58 | 121 | 190 | 180 | 0.5 μm |
| R-34 | 220 | 21300 | 95000 | 15 | 5.2 | 56 | 132 | 980 | 180 | 0.5 μm |
| R-35 | 170 | 21000 | 93000 | 20 | 7.1 | 48 | 109 | 10 | 640 | 0.5 μm |

Production Example of Toner for Electrophotography (T)

Production Example T-1

6 mass % of carbon black (MA100, a product of Mitsubishi Kasei Corporation) as a coloring agent and 0.5 mass % of a charge controlling agent (T-77, a product of Hodogaya Chemical Co., Ltd.) were added to 100 mass % of the binder resin (R) as illustrated in Table 8. The resulting mixture was mixed by means of a Henschel mixer, and then kneaded by means of a twin screw kneader (PCM-30 type, a product of Ikegai Corporation) at 90 degrees centigrade of the resin temperature at the discharge portion of the twin screw kneader for 30 seconds of the residence time. Next, after cooling, grinding and classify, 1.5 mass % of hydrophobic fine silica powder (Aerosil R-812, a product of Nippon Aerosil Co., Ltd.) was added to 100 mass % of the toner particle, whereby a toner T-1 having a volume median diameter D50 of about 7 micro-meters measured using a coulter counter was obtained. The physical properties are shown in Table 8.

Production Example T-2

A toner T-2 was obtained in the same manner as in Production Example T-1, except that 5 mass % of a cyan pigment (Toner Cyan BG; a product of Clariant) as a coloring agent and 0.5 mass % of a salicylic acid based metal complex (E-84; a product of Orient Chemical Industries Co., Ltd.) as a charge controlling agent were used. The physical properties are shown in Table 8.

Production Example T-3

A toner T-3 was obtained in the same manner as in Production Example T-2, except that 6 mass % of a magenta pigment (Toner Magenta E02; a product of Clariant) was used as a coloring agent. The physical properties are shown in Table 8.

Production Example T-4

A toner T-4 was obtained in the same manner as in Production Example T-2, except that 7 mass % of a yellow pigment (Toner Yellow HG; a product of Clariant) was used as a coloring agent. The physical properties are shown in Table 8.

Production Examples T-5 to T-30

Toners T-5 to T-30 having D50 of about 7 micro-meters was obtained in the same manner as in Production Example T-1, except for the change to 100 mass % of the binder resin (R) as illustrated in Table 8. The physical properties are shown in Table 8.

Production Example T-31

5 mass parts of a cyan pigment (Toner Cyan BG; a product of Clariant) as a coloring agent, 0.5 mass % of a salicylic acid based metal complex (E-84; a product of Orient Chemical Industries Co., Ltd.) as a charge controlling agent and 2.5 mass % of a releasing agent (Polypropylene wax NP055; a product of Mitsui Chemicals Inc.) were added to 100 mass % of the binder resin (R) as illustrated in Table 8. The resulting mixture was mixed by means of a Henschel mixer, and then kneaded by means of a twin screw kneader (PCM-30 type, a product of Ikegai Corporation) at 90 degrees centigrade of the resin temperature at the discharge portion of the twin screw kneader for 30 seconds of the residence time. Next, after cooling, grinding and classifying, 1.5 mass % of hydrophobic fine silica powder (Aerosil R-812, a product of Nippon Aerosil Co., Ltd.) was added to 100 mass parts of the toner particle, whereby a toner T-31 having D50 of about 7 micro-meters was obtained. The physical properties are shown in Table 8.

Production Examples T-32 to T-38

Toners T-32 to T-38 having D50 of about 7 micro-meters were obtained in the same manner as in Production Example T-1, except for the change to 100 mass % of the binder resin (R) as illustrated in Table 8. The physical properties are shown in Table 8.

Examples 1 to 25 and Comparative Examples 1 to 13

97 mass % of a carrier (F-150, a product of Powdertech Corp.) was mixed to 3 mass % of the toner as described in Table 8 to give a developing agent. Various evaluations were performed for the resulting developing agent. The results are shown in Table 9.

TABLE 8

(Physical Properties of Toner)

| Name of Toner | Binder Resin | Peak Molecular Weight | Mw | Mw/Mn | THF Soluble Portion having a molecular weight of not more than 2000 mass % | Tg °C. | Tm °C. | G' at 160° C. Pa | Residual Volatile Content ppm | WAX Dispersion |
|---|---|---|---|---|---|---|---|---|---|---|
| T-1 | Black | R-1 | 24600 | 63000 | 10 | 5.3 | 56 | 118 | 520 | 160 | 0.5 μm |
| T-2 | Cyan | R-1 | 24500 | 61000 | 10 | 5.4 | 56 | 118 | 560 | 160 | 0.5 μm |
| T-3 | Magenta | R-1 | 24300 | 59000 | 9 | 5.3 | 56 | 118 | 570 | 160 | 0.5 μm |
| T-4 | Yellow | R-1 | 24500 | 62000 | 10 | 5.1 | 56 | 118 | 550 | 160 | 0.5 μm |
| T-5 | Cyan | R-2 | 21500 | 53000 | 9 | 5.2 | 52 | 108 | 380 | 160 | 0.5 μm |
| T-6 | Cyan | R-3 | 21400 | 59000 | 10 | 5.1 | 55 | 113 | 390 | 160 | 0.5 μm |
| T-7 | Cyan | R-4 | 21600 | 61000 | 10 | 5.9 | 52 | 109 | 410 | 160 | 0.5 μm |
| T-8 | Cyan | R-5 | 21300 | 55000 | 9 | 4.6 | 55 | 112 | 420 | 160 | 0.5 μm |
| T-9 | Cyan | R-6 | 21200 | 56000 | 9 | 5.1 | 53 | 112 | 400 | 160 | 0.5 μm |
| T-10 | Cyan | R-7 | 21300 | 55000 | 9 | 5.2 | 53 | 111 | 390 | 160 | 0.5 μm |
| T-11 | Cyan | R-8 | 36200 | 72000 | 12 | 5.3 | 57 | 119 | 760 | 160 | 0.5 μm |
| T-12 | Cyan | R-9 | 21000 | 92000 | 14 | 4.9 | 52 | 119 | 620 | 160 | 0.5 μm |
| T-13 | Cyan | R-10 | 21800 | 43000 | 7 | 5.5 | 52 | 108 | 350 | 160 | 0.5 μm |
| T-14 | Cyan | R-11 | 21500 | 53000 | 9 | 5.7 | 50 | 109 | 370 | 160 | 0.5 μm |
| T-15 | Cyan | R-12 | 22000 | 60000 | 8 | 5.9 | 50 | 109 | 380 | 160 | 0.5 μm |
| T-16 | Cyan | R-13 | 21600 | 51000 | 9 | 4.3 | 55 | 112 | 400 | 160 | 0.5 μm |
| T-17 | Cyan | R-14 | 22100 | 59000 | 10 | 6 | 51 | 108 | 400 | 160 | 0.5 μm |
| T-18 | Cyan | R-15 | 21500 | 51000 | 9 | 4.9 | 56 | 116 | 460 | 160 | 0.5 μm |
| T-19 | Cyan | R-16 | 24300 | 49000 | 8 | 4.5 | 52 | 107 | 380 | 160 | 0.5 μm |
| T-20 | Cyan | R-17 | 21700 | 53000 | 9 | 5.1 | 52 | 112 | 380 | 160 | 0.5 μm |
| T-21 | Cyan | R-18 | 23800 | 48000 | 8 | 5.1 | 52 | 108 | 370 | 160 | 0.5 μm |
| T-22 | Cyan | R-19 | 22000 | 61000 | 10 | 5.3 | 52 | 110 | 370 | 160 | 0.5 μm |
| T-23 | Cyan | R-20 | 21800 | 63000 | 11 | 5.3 | 52 | 111 | 410 | 160 | 0.5 μm |
| T-24 | Cyan | R-21 | 24000 | 75000 | 13 | 5.4 | 57 | 120 | 760 | 140 | 0.5 μm |
| T-25 | Cyan | R-22 | 24200 | 60000 | 10 | 5.1 | 56 | 117 | 480 | 170 | 0.5 μm |
| T-26 | Cyan | R-23 | 51000 | 82000 | 14 | 4.8 | 54 | 126 | 930 | 160 | 0.5 μm |
| T-27 | Cyan | R-24 | 13500 | 64000 | 18 | 9.2 | 52 | 110 | 380 | 160 | 0.5 μm |
| T-28 | Cyan | R-25 | 18500 | 53000 | 15 | 7.3 | 56 | 115 | 540 | 160 | 0.5 μm |
| T-29 | Cyan | R-26 | 19700 | 51000 | 7 | 8.4 | 52 | 110 | 380 | 160 | 0.5 μm |
| T-30 | Cyan | R-27 | 22200 | 65000 | 11 | 5.1 | 54 | 114 | 400 | 160 | 2 μm |
| T-31 | Cyan | R-28 | 22000 | 63000 | 10 | 4.9 | 58 | 119 | 480 | 160 | 2 μm |
| T-32 | Cyan | R-29 | 21000 | 120000 | 20 | 5.1 | 54 | 131 | 6030 | 160 | 0.5 μm |
| T-33 | Cyan | R-30 | 21800 | 28000 | 4 | 6.1 | 51 | 103 | 40 | 160 | 0.5 μm |
| T-34 | Cyan | R-31 | 24300 | 82000 | 12 | 5.9 | 52 | 126 | 1200 | 160 | 0.5 μm |
| T-35 | Cyan | R-32 | 24100 | 65000 | 10 | 6.3 | 52 | 115 | 400 | 160 | 0.5 μm |
| T-36 | Cyan | R-33 | 21900 | 49000 | 8 | 6.1 | 58 | 115 | 480 | 160 | 0.5 μm |
| T-37 | Cyan | R-34 | 21500 | 63000 | 10 | 5.5 | 56 | 127 | 1100 | 160 | 0.5 μm |
| T-38 | Cyan | R-35 | 21100 | 59000 | 10 | 7.2 | 48 | 107 | 300 | 590 | 0.5 μm |

TABLE 9

(Toner Evaluation Results)

| Example/Comparative Example No. | Name of Toner | Fixing Properties | Offset Resistance | Cleaning Properties | Storage Stability | Durability | Productivity | Gloss |
|---|---|---|---|---|---|---|---|---|
| Example 1 | T-1 | A | A | A | A | A | A | A |
| Example 2 | T-2 | A | A | A | A | A | A | A |
| Example 3 | T-3 | A | A | A | A | A | A | A |
| Example 4 | T-4 | A | A | A | A | A | A | A |
| Example 5 | T-5 | A | A | A | A | A | A | A |
| Example 6 | T-6 | A | A | A | A | A | A | A |
| Example 7 | T-7 | A | A | A | A | A | A | A |
| Example 8 | T-8 | A | A | A | A | A | A | A |
| Example 9 | T-9 | A | A | A | A | A | A | A |
| Example 10 | T-10 | A | A | A | A | A | A | A |
| Example 11 | T-11 | B | A | A | A | A | B | B |
| Example 12 | T-12 | B | A | A | A | A | B | B |
| Example 13 | T-13 | A | B | A | A | B | A | A |
| Example 14 | T-14 | A | A | A | A | A | A | A |
| Example 15 | T-15 | A | A | B | B | A | B | A |
| Example 16 | T-16 | A | A | A | A | A | A | A |
| Example 17 | T-17 | A | A | A | A | A | A | A |
| Example 18 | T-18 | A | A | A | A | A | A | A |
| Example 19 | T-19 | A | B | A | A | A | A | A |
| Example 20 | T-20 | A | A | A | A | A | A | A |
| Example 21 | T-21 | A | B | A | A | A | A | A |
| Example 22 | T-22 | A | A | A | A | A | A | A |
| Example 23 | T-23 | A | A | A | A | A | A | A |
| Example 24 | T-24 | A | A | A | A | A | A | B |
| Example 25 | T-25 | A | B | A | A | A | A | A |
| Comparative Example 1 | T-26 | C | A | A | A | A | C | C |
| Comparative Example 2 | T-27 | A | A | C | C | C | A | A |
| Comparative Example 3 | T-28 | A | A | C | C | B | A | A |
| Comparative Example 4 | T-29 | A | A | C | C | A | A | A |
| Comparative Example 5 | T-30 | A | A | C | C | A | C | A |
| Comparative Example 6 | T-31 | C | C | A | A | A | A | C |
| Comparative Example 7 | T-32 | C | A | A | A | A | C | C |
| Comparative Example 8 | T-33 | A | C | C | A | C | A | C |
| Comparative Example 9 | T-34 | A | A | A | A | A | A | C |
| Comparative Example 10 | T-35 | A | C | A | A | A | A | C |
| Comparative Example 11 | T-36 | C | A | A | A | A | A | C |
| Comparative Example 12 | T-37 | A | A | A | A | A | A | C |
| Comparative Example 13 | T-38 | A | A | C | C | A | C | A |

As clear from the results in Table 9, all of the binder resin for color toners and the color toner using the resin to be produced according to the present invention were excellent in balancing various properties required for a color toner.

The invention claimed is:

1. A binder resin for color toners, wherein the binder resin comprises at least a carboxyl group-containing vinyl resin (C), a glycidyl group-containing vinyl resin (E) and a reaction product thereof, the storage modulus G' at 160 degrees centigrade is not less than 20 Pa and less than 800 Pa measured at a frequency of 6.28 rad/sec, the tetrahydrofuran (THF) soluble portion in the binder resin has a main peak in the molecular weight region of not less than 20,000 and less than 40,000 in the molecular weight distribution measured by gel permeation chromatography (GPC), the binder resin contains at least one of releasing agents having a melting point of not lower than 60 degrees centigrade and not higher than 120 degrees centigrade in an amount of not less than 3.5 mass % and not more than 12 mass % based on 100 mass % of the total amount of said carboxyl group-containing vinyl resin (C), said glycidyl group-containing vinyl resin (E) and the reaction product thereof, said carboxyl group-containing vinyl resin (C) contains a high molecular weight vinyl resin (H) in which the THF soluble portion has a peak in the molecular weight region of not less than 150,000 and less than 350,000 in the GPC chromatogram and a low molecular weight vinyl resin (L) in which the THF soluble portion has a peak in the molecular weight region of not less than 20,000 and less than 40,000 in the GPC chromatogram, the mass ratio (H/L) of the high molecular weight vinyl resin (H) to the low molecular weight vinyl resin (L) in said carboxyl group-containing vinyl resin (C) is from 10/90 to 30/70, and the integrated value of the content of the tetrahydrofuran (THF) soluble portion in said binder resin in the molecular weight region of not more than 2,000 is not more than 7.0 mass % based on the total THF soluble portion.

2. The binder resin for color toners as set forth in claim 1, wherein the weight-average molecular weight (Mw) is not more than 170,000 and the weight-average molecular weight (Mw)/the number-average molecular weight (Mn) is not less than 5 and not more than 40.

3. The binder resin for color toners as set forth in claim 1, wherein the content of a volatile component remained in said binder resin is not more than 200 ppm.

4. The binder resin for color toners as set forth in claim 1, wherein the softening point is not more than 130 degrees centigrade.

5. The binder resin for color toners as set forth in claim 1, wherein said releasing agent in said binder resin is dispersed with an average diameter of not more than 1 micro-meter.

6. The binder resin for color toners as set forth in claim 1, satisfying the following conditions:
the acid value of the high molecular weight vinyl resin (H) in said carboxyl group-containing vinyl resin (C) is not less than 10 mgKOH/g and not more than 26 mgKOH/g and the acid value of the low molecular weight vinyl resin (L) is not less than 6 mgKOH/g and not more than 30 mgKOH/g;
the acid value of said carboxyl group-containing vinyl resin (C) is not less than 6 mgKOH/g and not more than 30 mgKOH/g;
the THF soluble portion in said glycidyl group-containing vinyl resin (E) has a peak in the molecular weight region of not less than 20,000 and not more than 80,000 in the GPC chromatogram and the epoxy value of said glycidyl group-containing vinyl resin (E) is not less than 0.003 Eq/100 g and not more than 0.022 Eq/100 g; and
the mass ratio (C/E) of said carboxyl group-containing vinyl resin (C) to said glycidyl group-containing vinyl resin (E) is from 87/13 to 99/1.

7. The binder resin for color toners as set forth in claim 1, wherein the binder resin contains a block copolymer comprising:
a block comprising a sequence of ethylenically unsaturated hydrocarbon derived constituent units and/or conjugated diene type hydrocarbon-derived constituent units, and
a block comprising a sequence of styrene-derived constituent units, and/or
the hydrogenated product of the block copolymer, in an amount of not less than 0.05 mass % and not more than 0.6 mass % based on 100 mass % of said carboxyl group-containing vinyl resin (C).

8. A method for producing the binder resin for color toners as set forth in claim 6, comprising a polymerizing said low molecular weight vinyl resin (L) in the presence of at least one of releasing agents having a melting point of not lower than 60 degrees centigrade and not higher than 120 degrees centigrade, and an amount of not less than 2 mass % and not more than 13 mass % based on 100 mass % of the constituent monomer of said low molecular weight vinyl resin (L).

9. A method for producing the binder resin for color toners as set forth in claim 1, comprising a melt-kneading at least one of the carboxyl group-containing vinyl resins (C) and at least one of the glycidyl group-containing vinyl resins (E) at a temperature range of not lower than 140 degrees centigrade and not higher than 210 degrees centigrade, and reacting a carboxyl group with a glycidyl group.

10. A color toner comprising at least the binder resin for color toners as set forth in claim 1, a coloring agent and a charge controlling agent.

11. The color toner as set forth in claim 10, wherein said color toner is obtained by a grinding method.

12. The color toner as set forth in claim 10, wherein the storage modulus G' at 160 degrees centigrade is not less than 100 and less than 800 Pa measured at a frequency of 6.28 rad/sec.

13. A binder resin for color toners, wherein the binder resin comprises at least a carboxyl group-containing vinyl resin (C), a glycidyl group-containing vinyl resin (E) and a reaction product thereof,
the storage modulus G' at 160 degrees centigrade is not less than 20 Pa and less than 800 Pa measured at a frequency of 6.28 rad/sec,
the tetrahydrofuran (THF) soluble portion in the binder resin has a main peak in the molecular weight region of not less than 20,000 and less than 40,000 in the molecular weight distribution measured by gel permeation chromatography (GPC),
the binder resin contains at least one of releasing agents having a melting point of not lower than 60 degrees centigrade and not higher than 120 degrees centigrade in an amount of not less than 3.5 mass % and not more than 12 mass % based on 100 mass % of the total amount of said carboxyl group-containing vinyl resin (C), said glycidyl group-containing vinyl resin (E) and a reaction product thereof,
the integrated value of the content of the tetrahydrofuran (THF) soluble portion in the binder resin in the molecular weight region of not more than 2,000 is not more than 7.0 mass % based on the total THF soluble portion,
the weight-average molecular weight (Mw) is not more than 170,000 and the weight-average molecular weight (Mw)/the number-average molecular weight (Mn) is not less than 5 and not more than 40,
said carboxyl group-containing vinyl resin (C) contains a high molecular weight vinyl resin (H) in which the THF soluble portion has a peak in the molecular weight region of not less than 150,000 and less than 350,000 in the GPC chromatogram and a low molecular weight vinyl resin (L) in which the THF soluble portion has a peak in the molecular weight region of not less than 20,000 and less than 40,000 in the GPC chromatogram, and
the mass ratio (H/L) of the high molecular weight vinyl resin (H) to the low molecular weight vinyl resin (L) in said carboxyl group-containing vinyl resin (C) is from 10/90 to 30/70.

14. The binder resin for color toners as set forth in claim 13, wherein the content of a volatile component remained in said binder resin is not more than 200 ppm.

15. The binder resin for color toners as set forth in claim 13, wherein the softening point is not more than 130 degrees centigrade.

16. The binder resin for color toners as set forth in claim 13, wherein said releasing agent in said binder resin is dispersed with an average diameter of not more than 1 micro-meter.

17. The binder resin for color toners as set forth in claim 13, satisfying the following conditions:
the acid value of the high molecular weight vinyl resin (H) in said carboxyl group-containing vinyl resin (C) is not less than 10 mgKOH/g and not more than 26 mgKOH/g and the acid value of the low molecular weight vinyl resin (L) is not less than 6 mgKOH/g and not more than 30 mgKOH/g;

the acid value of said carboxyl group-containing vinyl resin (C) is not less than 6 mgKOH/g and not more than 30 mgKOH/g;

the THF soluble portion in said glycidyl group-containing vinyl resin (E) has a peak in the molecular weight region of not less than 20,000 and not more than 80,000 in the GPC chromatogram and the epoxy value of said glycidyl group-containing vinyl resin (E) is not less than 0.003 Eq/100 g and not more than 0.022 Eq/100 g; and the mass ratio (C/E) of said carboxyl group-containing vinyl resin (C) to said glycidyl group-containing vinyl resin (E) is from 87/13 to 99/1.

18. The binder resin for color toners as set forth in claim 13, wherein the binder resin contains a block copolymer comprising:

a block comprising a sequence of ethylenically unsaturated hydrocarbon derived constituent units and/or conjugated diene type hydrocarbon-derived constituent units, and a block comprising a sequence of styrene-derived constituent units, and/or the hydrogenated product of the block copolymer, in an amount of not less than 0.05 mass % and not more than 0.6 mass % based on 100 mass % of said carboxyl group-containing vinyl resin (C).

19. A method for producing the binder resin for color toners as set forth in claim 17, comprising a polymerizing said low molecular weight vinyl resin (L) in the presence of at least one of releasing agents having a melting point of not lower than 60 degrees centigrade and not higher than 120 degrees centigrade, and an amount of not less than 2 mass % and not more than 13 mass % based on 100 mass % of the constituent monomer of said low molecular weight vinyl resin (L).

20. A method for producing the binder resin for color toners as set forth in claim 13, comprising a melt-kneading at least one of the carboxyl group-containing vinyl resins (C) and at least one of the glycidyl group-containing vinyl resins (E) at a temperature range of not lower than 140 degrees centigrade and not higher than 210 degrees centigrade, and reacting a carboxyl group with a glycidyl group.

21. A color toner comprising at least the binder resin for color toners as set forth in claim 13, a coloring agent and a charge controlling agent.

22. The color toner as set forth in claim 21, wherein the color toner is obtained by a grinding method.

23. The color toner as set forth in claim 21, wherein the storage modulus G' at 160 degrees centigrade is not less than 100 Pa and less than 800 Pa measured at a frequency of 6.28 rad/sec.

* * * * *